(12) United States Patent
Katano

(10) Patent No.: US 11,618,224 B2
(45) Date of Patent: Apr. 4, 2023

(54) HIGH-PRESSURE TANK, METHOD FOR MANUFACTURING HIGH-PRESSURE TANK, AND METHOD FOR MANUFACTURING FIBER-REINFORCED RESIN LAYER FOR HIGH-PRESSURE TANK

(71) Applicant: TOYOTA JIDOSHA KABUSHIKI KAISHA, Toyota (JP)

(72) Inventor: Koji Katano, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 17/094,122

(22) Filed: Nov. 10, 2020

(65) Prior Publication Data
US 2021/0197499 A1    Jul. 1, 2021

(30) Foreign Application Priority Data

Dec. 25, 2019  (JP) .............................. JP2019-235219

(51) Int. Cl.
*B29C 70/28* (2006.01)
*F17C 1/02* (2006.01)
*B29L 31/00* (2006.01)

(52) U.S. Cl.
CPC ................ *B29C 70/28* (2013.01); *F17C 1/02* (2013.01); *B29L 2031/712* (2013.01); *F17C 2201/0109* (2013.01); *F17C 2203/012* (2013.01); *F17C 2203/0604* (2013.01); *F17C 2203/067* (2013.01); *F17C 2203/0621* (2013.01);

(Continued)

(58) Field of Classification Search
CPC ............... B29C 70/28; B29L 2031/712; F17C 2209/2163; F17C 2209/232
See application file for complete search history.

(56) References Cited

U.S. PATENT DOCUMENTS

| | | | |
|---|---|---|---|
| 3,372,075 A * | 3/1968 | Holt .......................... | F17C 3/02 428/116 |
| 7,743,940 B2 * | 6/2010 | Brunnhofer ............... | F17C 3/06 220/592.27 |
| 8,932,695 B1 | 1/2015 | Villarreal et al. | |

(Continued)

FOREIGN PATENT DOCUMENTS

| | | |
|---|---|---|
| CN | 102388257 A | 3/2012 |
| CN | 202674303 U | 1/2013 |

(Continued)

*Primary Examiner* — Stephen J Castellano
(74) *Attorney, Agent, or Firm* — Hunton Andrews Kurth LLP

(57) ABSTRACT

A method for manufacturing a high-pressure tank including a liner and a fiber-reinforced resin layer, the fiber-reinforced resin layer having a first reinforcing layer covering an outer surface of the liner and a second reinforcing layer covering an outer surface of the first reinforcing layer includes: forming a cylinder member made of a fiber-reinforced resin and having fibers oriented in a circumferential direction of the cylinder member; forming two dome members made of the fiber-reinforced resin; forming a reinforcing body that is the first reinforcing layer by joining the cylinder member and the dome members; and forming on an outer surface of the reinforcing body the second reinforcing layer made of the fiber-reinforced resin and having fibers oriented across the dome members.

9 Claims, 19 Drawing Sheets

(52) U.S. Cl.
CPC .......................... *F17C 2209/2163* (2013.01); *F17C 2209/232* (2013.01); *F17C 2221/012* (2013.01)

(56) References Cited

U.S. PATENT DOCUMENTS

| | | |
|---|---|---|
| 2005/0076995 A1 | 4/2005 | Yasui |
| 2006/0065664 A1 | 3/2006 | Ohta et al. |
| 2011/0210475 A1 | 9/2011 | Strack et al. |
| 2012/0048862 A1 | 3/2012 | Otsuka et al. |
| 2017/0136716 A1 | 5/2017 | Shindo et al. |
| 2020/0240586 A1* | 7/2020 | Sonnen .................... F17C 1/06 |

FOREIGN PATENT DOCUMENTS

| | | |
|---|---|---|
| EP | 2418414 A1 | 2/2012 |
| EP | 3170645 A1 | 5/2017 |
| EP | 3289277 A1 | 3/2018 |
| GB | 930156 A | 7/1963 |
| JP | 2005214271 A | 8/2005 |
| JP | 2010236614 A | 10/2010 |
| JP | 2012096381 A | 5/2012 |
| JP | 2012149739 A | 8/2012 |
| JP | 2017094491 A | 6/2017 |
| JP | 2017110669 A | 6/2017 |
| JP | 2019044937 A | 3/2019 |
| WO | 9221509 A1 | 12/1992 |
| WO | 2018210606 A1 | 11/2018 |

\* cited by examiner

HIGH-PRESSURE TANK, METHOD FOR MANUFACTURING HIGH-PRESSURE TANK, AND METHOD FOR MANUFACTURING FIBER-REINFORCED RESIN LAYER FOR HIGH-PRESSURE TANK

INCORPORATION BY REFERENCE

This current U.S. application claims the benefit of foreign priority to Japanese Patent Application No. 2019-235219 filed on Dec. 25, 2019. The disclosure of Japanese Patent Application No. 2019-235219 filed on Dec. 25, 2019 including the specification, drawings and abstract is incorporated herein by reference in its entirety.

BACKGROUND

1. Technical Field

The disclosure relates to a high-pressure tank including a liner configured to store gas and a fiber-reinforced resin layer made of a fiber-reinforced resin and covering the outer surface of the liner, a method for manufacturing a high-pressure tank, and a method for manufacturing a fiber-reinforced resin layer for a high-pressure tank.

2. Description of Related Art

A tank including a tank body and a boss attached to an opening end in the longitudinal direction of the tank body is conventionally known as a high-pressure tank that is used to store and supply hydrogen etc. For example, the tank body includes a liner for holding hydrogen gas airtight and a fiber-reinforced resin layer formed by winding a fiber bundle of a fiber-reinforced resin around the outer surface of the liner to reinforce the liner.

In a known method for manufacturing a high-pressure tank, a fiber-reinforced resin layer is formed by winding a fiber bundle around the outer surface of a liner by, e.g., filament winding (hereinafter also simply referred to as the "FW process") and curing the fiber bundle (e.g., Japanese Unexamined Patent Application Publication No. 2012-149739 (JP 2012-149739 A).

JP 2012-149739 A discloses a high-pressure tank including a liner and a fiber-reinforced plastic layer (fiber-reinforced resin layer) covering the outer surface of the liner. The fiber-reinforced plastic layer is composed of hoop layers formed by hoop-winding a resin-impregnated fiber bundle around the liner and helical layers formed by helically winding a resin-impregnated fiber bundle around the entire liner. The fiber-reinforced plastic layer is composed of a cylindrical cylinder section formed by the hoop layers and the helical layers and a pair of dome sections provided at both ends of the cylinder section and formed by the helical layers.

SUMMARY

In such a high-pressure tank as described in JP 2012-149739 A, the hoop layers provide the strength of the cylinder section, and the helical layers provide the strength of the dome sections. That is, the helical layers are also formed in the cylinder section but hardly contribute to the strength of the cylinder section. However, in the case where the fiber bundle is helically wound around the liner so as to run back and forth between both ends of the liner, the fiber bundle necessarily passes along the cylinder section. When the amount of fiber bundle required to provide sufficient strength of the dome sections is helically wound, the helical layers are also formed on the cylinder section. This unnecessarily increases the usage of the fiber-reinforced resin.

The disclosure provides a method for manufacturing a high-pressure tank that can reduce the usage of a fiber-reinforced resin.

A first aspect of the disclosure relates to a method for manufacturing a high-pressure tank including a liner configured to store gas and a fiber-reinforced resin layer made of a fiber-reinforced resin and covering an outer surface of the liner, the fiber-reinforced resin layer having a first reinforcing layer covering the outer surface of the liner and a second reinforcing layer covering an outer surface of the first reinforcing layer. The method includes: forming a cylinder member made of the fiber-reinforced resin and having fibers oriented in a circumferential direction of the cylinder member; forming two dome members made of the fiber-reinforced resin; forming a reinforcing body that is the first reinforcing layer by joining both end portions of the cylinder member and end portions of the two dome members; and forming on an outer surface of the reinforcing body the second reinforcing layer made of the fiber-reinforced resin and having fibers oriented across the two dome members.

According to the method of the disclosure, the cylinder member is formed. The cylinder member is made of the fiber-reinforced resin and has fibers oriented in the circumferential direction of the cylinder member. Since the fibers in the cylinder member are oriented in the circumferential direction, the strength of the fiber-reinforced resin layer against hoop stress that is generated by a gas pressure is provided by an appropriate amount of fiber-reinforced resin. The two dome members made of the fiber-reinforced resin are also formed. Since the dome members are formed separately from the cylinder member using an appropriate amount of fiber-reinforced resin, the usage of the fiber-reinforced resin for the cylinder member is not increased due to formation of the dome members.

The second reinforcing layer made of the fiber-reinforced resin and having fibers oriented across the two dome members are formed on the outer surface of the reinforcing body. The fibers in the second reinforcing layer prevent the dome members from being separated from the cylinder member. The dome members are thus prevented from coming off from the end portions of the cylinder member by the gas pressure. The amount of fibers in the second reinforcing layer need only be large enough to prevent the dome members from coming off from the cylinder member. Accordingly, the usage of the fiber-reinforced resin is reduced as compared to the helical layers in the cylinder section of the conventional high-pressure tank.

As described above, according to the method of the disclosure, each part of the fiber-reinforced resin layer is formed using an appropriate amount of fiber-reinforced resin. Accordingly, the fiber-reinforced resin is not unnecessarily used, and the usage of the fiber-reinforced resin for the second reinforcing layer on the cylinder member is reduced as compared to the conventional high-pressure tank.

In the above method, the cylinder member may be formed by connecting a plurality of cylinder bodies each made of the fiber-reinforced resin and having fibers oriented in a circumferential direction of the cylinder body. With this configuration, even a long cylinder member can be easily formed.

In the above method, either or both of the two dome members may be formed so as to have a through hole, and the liner may be formed such that the liner covers an inner surface of the reinforcing body by introducing a resin material into the reinforcing body through the through hole. With this configuration, the liner can be easily formed inside the reinforcing body even after the reinforcing body is formed. Moreover, no mold for molding the liner is necessary unlike the case where the liner is formed by injection molding using resin. The liner covering the inner surface of the reinforcing body may be formed either after or before the second reinforcing layer is formed on the outer surface of the reinforcing body.

In this case, the liner may be formed by introducing the resin material that has fluidity into the reinforcing body, rotating the reinforcing body to cause the resin material to cover the inner surface of the reinforcing body, and solidifying the resin material covering the inner surface of the reinforcing body. With this configuration, as the reinforcing body is rotated, the inner surface of the reinforcing body moves upward with the resin material having fluidity thereon, and a part of the resin material flows down the inner surface of the reinforcing body due to its own weight. The resin material thus covers the inner surface of the reinforcing body. Accordingly, the liner covering the inner surface of the reinforcing body can be easily formed.

In the above method, the second reinforcing layer may be formed by: placing a plurality of resin-impregnated fiber bundles in such a manner that the fiber bundles extend in an axial direction of the reinforcing body at predetermined intervals in a circumferential direction of the reinforcing body and at a predetermined distance from the outer surface of the reinforcing body; and rotating portions on a first end side of the fiber bundles relative to portions on a second end side of the fiber bundles in the circumferential direction of the reinforcing body. The portions on the first end side of the fiber bundles are rotated relative to the portions on the second end side of the fiber bundles in the circumferential direction of the reinforcing body. Accordingly, the fiber bundles are tilted with respect to an axial direction of the cylinder member, and the gaps between the fiber bundles are eliminated and the fiber bundles partially overlap each other. The fiber bundles gradually approach the outer surface of the reinforcing body and are placed onto the outer surface of the reinforcing body with no gap between the fiber bundles. At this time, the fiber bundles tilted with respect to the axial direction are brought into close contact with an outer surface of the cylinder member. The portions on the first end side of the fiber bundles and the portions on the second end side of the fiber bundles are then twisted outside the end portions of the cylinder member and wound around the outer surfaces of the dome members. The second reinforcing layer covering the outer surface of the reinforcing body is formed in this manner. According to this method, the second reinforcing layer is formed on the outer surface of the reinforcing body without rotating the reinforcing body in the circumferential direction. It is therefore not necessary to provide a structure for rotating the reinforcing body (typically, a boss to which a rotating shaft is attached) on the opposite end of the high-pressure tank from the through hole. The axial direction and the circumferential direction of the reinforcing body are the same as the axial direction and the circumferential direction of the cylinder member, respectively.

In this case, at least one first tilted layer and at least one second tilted layer may be formed when forming the second reinforcing layer, the at least one first tilted layer being formed by rotating the portions on the first end side of the fiber bundles in a first direction, and the at least one second tilted layer being formed by rotating the portions on the first end side of the fiber bundles in a second direction that is opposite to the first direction. The first tilted layer is formed with the fiber bundles being tilted with respect to the axial direction and subjected to predetermined tension. Accordingly, when an expansive force is applied to the second reinforcing layer by the gas pressure, the first tilted layer is subjected to a force in such a direction that the tilt of its fiber bundles with respect to the axial direction is eliminated. As a result, the reinforcing body is distorted. Similarly, the second tilted layer is formed with the fiber bundles being tilted in the opposite direction to the fiber bundles of the first tilted layer and subjected to predetermined tension. Accordingly, when the expansive force is applied to the second reinforcing layer by the gas pressure, the second tilted layer is subjected to a force in such a direction that the tilt of its fiber bundles in the opposite direction to the tilt of the fiber bundles of the first tilted layer is eliminated. As a result, the reinforcing body is distorted. The fiber bundles of the first tilted layer and the fiber bundles of the second tilted layer are tilted in opposite directions. Accordingly, when the expansive force is applied to the second reinforcing layer by the gas pressure, the force in such a direction that the tilt of the fiber bundles of the first tilted layer is eliminated and the force in such a direction that the tilt of the fiber bundles of the second tilted layer is eliminated act to cancel each other out. This reduces distortion of the fiber-reinforced resin layer and therefore restrains reduction in strength of the high-pressure tank.

In the case where the at least one tilted layer and the at least one second tilted layer are formed, the number of the at least one first tilted layer and the number of the at least one second tilted layer may be the same. With this configuration, the force in such a direction that the tilt of the fiber bundles of the first tilted layer is eliminated and the force in such a direction that the tilt of the fiber bundles of the second tilted layer is eliminated effectively act to cancel each other out. This effectively reduces distortion of the fiber-reinforced resin layer due to the tilt of the fiber bundles and therefore effectively restrains reduction in strength of the high-pressure tank.

In the above method, after thermally curing the cylinder member, the cylinder member may be inserted into either or both of the two dome members, and the cylinder member and the either or both of the two dome members may be joined together. The strength of the cylinder member is thus increased in advance by the thermal curing. Accordingly, when fitting the cylinder member and the dome member together, the end portion of the dome member conforms to the end portion of the cylinder member, and the end portion of the cylinder member functions as a guide portion. The cylinder member and the dome member can thus be easily fitted together. In the case where the dome members are not thermally cured in advance, the dome member may be deformed when fitting the cylinder member and the dome member together. However, even when such deformation of the dome member occurs, the dome member can be pressed from the outside so that the dome member conforms to the cylinder member. The outer shape of the dome member can thus be adjusted or the dome member can be brought into close contact with the cylinder member.

In the above method, after thermally curing either or both of the two dome members, the either or both of the two dome members may be inserted into the cylinder member, and the either or both of the two dome members and the cylinder member may be joined together. The strength of the either or both of the two dome members is thus increased in advance by the thermal curing. Accordingly, when fitting the dome member and the cylinder member together, the end portion of the cylinder member conforms to the end portion of the dome member, and the end portion of the dome member functions as a guide portion. The dome member and the cylinder member can thus be easily fitted together. In the case where the cylinder member is not thermally cured in advance, the cylinder member may be deformed when fitting the dome member and the cylinder member together. However, even when such deformation of the cylinder member occurs, the cylinder member can be pressed from the outside so that the cylinder member conforms to the dome member. The outer shape of the cylinder member can thus be adjusted or the cylinder member can be brought into close contact with the dome member.

In the above method, the two dome members may be formed by winding a resin-impregnated fiber bundle around a predetermined die in such a manner that the fiber bundle covers an outer surface of the predetermined die and then dividing a resultant winding body of the fiber bundle wound around the predetermined die into parts. With this configuration, the fiber bundle can be easily wound on the predetermined die using, e.g., the FW process, and the two dome members can be easily formed by dividing the winding body of the fiber bundle into parts and removing the parts from the predetermined die.

A second aspect of the disclosure relates to a high-pressure tank including: a liner configured to store gas; and a fiber-reinforced resin layer made of a fiber-reinforced resin and covering an outer surface of the liner, the fiber-reinforced resin layer having a first reinforcing layer covering the outer surface of the liner and a second reinforcing layer covering an outer surface of the first reinforcing layer. The first reinforcing layer includes a cylinder member made of the fiber-reinforced resin and having fibers oriented in a circumferential direction of the cylinder member and two dome members made of the fiber-reinforced resin. Both end portions of the cylinder member are joined to end portions of the two dome members. The second reinforcing layer has fibers oriented across the two dome members.

According to the high-pressure tank of the disclosure, the first reinforcing layer includes the cylinder member made of the fiber-reinforced resin and having fibers oriented in the circumferential direction of the cylinder member. Since the fibers in the cylinder member are oriented in the circumferential direction, the strength of the fiber-reinforced resin layer against hoop stress that is generated by a gas pressure is provided by an appropriate amount of fiber-reinforced resin. Since the two dome members are formed separately from the cylinder member using an appropriate amount of fiber-reinforced resin, the usage of the fiber-reinforced resin for the cylinder member is not increased due to formation of the dome members.

The second reinforcing layer is made of the fiber-reinforced resin and has fibers oriented across the two dome members. The fibers in the second reinforcing layer prevent the dome members from being separated from the cylinder member. The dome members are thus prevented from coming off from the end portions of the cylinder member by the gas pressure. The amount of fibers in the second reinforcing layer need only be large enough to prevent the dome members from coming off from the cylinder member. Accordingly, the usage of the fiber-reinforced resin is reduced as compared to the helical layers in the cylinder section of the conventional high-pressure tank.

As described above, according to the high-pressure tank of the disclosure, each part of the fiber-reinforced resin layer is formed using an appropriate amount of fiber-reinforced resin. Accordingly, the fiber-reinforced resin is not unnecessarily used, and the usage of the fiber-reinforced resin for the second reinforcing layer on the cylinder member is reduced as compared to the conventional high-pressure tank.

In the above high-pressure tank, the second reinforcing layer may have, along an entire circumference of the second reinforcing layer, a plurality of fiber bundles oriented across the two dome members, the fiber bundles may include a first tilted layer in which the fiber bundles are tilted with respect to an axial direction of the first reinforcing layer and a second tilted layer in which the fiber bundles are tilted in an opposite direction to that of the fiber bundles of the first tilted layer with respect to the axial direction, and the second reinforcing layer may have the first and second tilted layers stacked on each other. The first tilted layer is formed with the fiber bundles being tilted with respect to the axial direction and subjected to predetermined tension. Accordingly, when an expansive force is applied to the second reinforcing layer by the gas pressure, the first tilted layer is subjected to a force in such a direction that the tilt of its fiber bundles with respect to the axial direction is eliminated. As a result, the first reinforcing layer is distorted. Similarly, the second tilted layer is formed with the fiber bundles being tilted in the opposite direction to the fiber bundles of the first tilted layer and subjected to predetermined tension. Accordingly, when the expansive force is applied to the second reinforcing layer by the gas pressure, the second tilted layer is subjected to a force in such a direction that the tilt of its fiber bundles in the opposite direction to the tilt of the fiber bundles of the first tilted layer is eliminated. As a result, the first reinforcing layer is distorted. The fiber bundles of the first tilted layer and the fiber bundles of the second tilted layer are tilted in opposite directions. Accordingly, when the expansive force is applied to the second reinforcing layer by the gas pressure, the force in such a direction that the tilt of the fiber bundles of the first tilted layer is eliminated and the force in such a direction that the tilt of the fiber bundles of the second tilted layer is eliminated act to cancel each other out. This reduces distortion of the fiber-reinforced resin layer and therefore restrains reduction in strength of the high-pressure tank.

A third aspect of the disclosure relates to a method for manufacturing a fiber-reinforced resin layer for a high-pressure tank including (i) a liner configured to store gas and (ii) the fiber-reinforced resin layer made of a fiber-reinforced resin and covering an outer surface of the liner, the fiber-reinforced resin layer having a first reinforcing layer covering the outer surface of the liner and a second reinforcing layer covering an outer surface of the first reinforcing layer. This method includes: forming a cylinder member made of the fiber-reinforced resin and having fibers oriented in a circumferential direction of the cylinder member; forming two dome members made of the fiber-reinforced resin; forming a reinforcing body that is the first reinforcing layer by joining both end portions of the cylinder member and end portions of the two dome members; and forming on an outer surface of the reinforcing body the second reinforcing layer made of the fiber-reinforced resin and having fibers oriented across the two dome members.

The disclosure thus provides a high-pressure tank, a method for manufacturing a high-pressure tank, and a method for manufacturing a fiber-reinforced resin layer for a high-pressure tank which can reduce the usage of a fiber-reinforced resin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Before describing a method for manufacturing a high-pressure tank 10 according to an embodiment of the disclosure, the configuration of the high-pressure tank 10 will be briefly described with reference to the drawings. Although the high-pressure tank 10 is herein described as a tank that is mounted on a fuel cell vehicle and that is filled with high-pressure hydrogen gas, the high-pressure tank 10 can also be used in other applications. The gas that can be used to fill the high-pressure tank 10 is not limited to high-pressure hydrogen gas.

Figure 1:
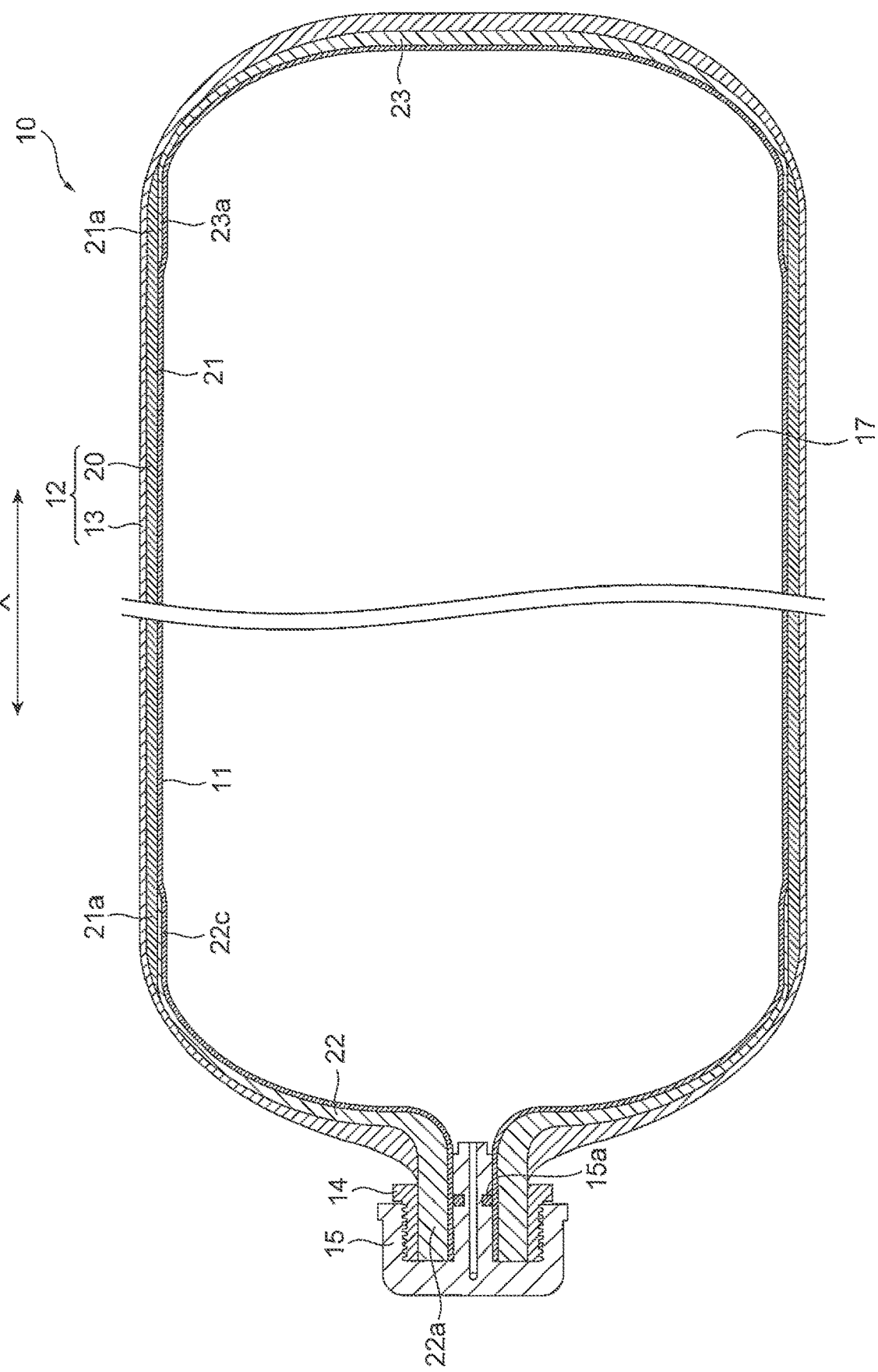
FIG. 1 is a sectional view illustrating the structure of a high-pressure tank that is manufactured by a method according to an embodiment of the disclosure.
Figure 2:
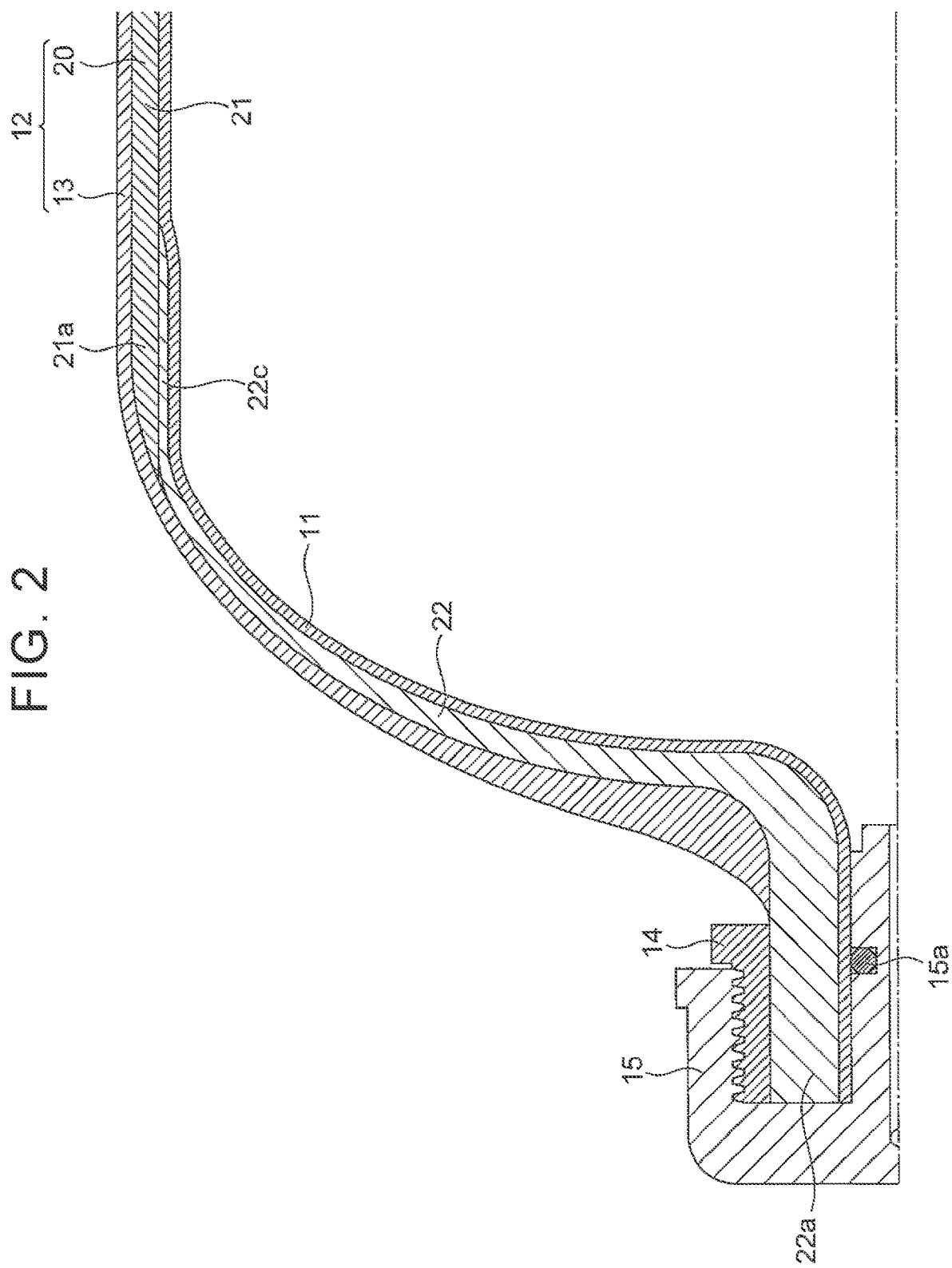
FIG. 2 is a partial sectional view illustrating the structure of a high-pressure tank that is manufactured by the method according to the embodiment of the disclosure.

As shown in FIGS. 1 and 2, the high-pressure tank 10 is a generally cylindrical high-pressure gas storage container with both ends rounded in a dome shape. The high-pressure tank 10 includes a liner 11 having gas barrier properties and a fiber-reinforced resin layer 12 made of a fiber-reinforced resin and covering the outer surface of the liner 11. The fiber-reinforced resin layer 12 has a reinforcing body 20 and a second reinforcing layer 13. The reinforcing body 20 is a first reinforcing layer and covers the outer surface of the liner 11, and the second reinforcing layer 13 covers the outer surface of the reinforcing body 20. The high-pressure tank 10 has an opening in its one end and has a boss 14 attached around the opening. The high-pressure tank 10 has no opening in the other end and has no boss attached to the other end.

The liner 11 extends along the inner surface of the reinforcing body 20. The liner 11 is a resin member forming a housing space 17 that is filled with high-pressure hydrogen gas. The resin for the liner 11 is preferably a resin capable of holding filling gas (in this example, hydrogen gas) in the housing space 17, namely a resin having satisfactory gas barrier properties. Examples of such a resin include thermoplastic resins such as polyamide, polyethylene, ethylene-vinyl alcohol copolymer resin (EVOH), and polyester and thermosetting resins such as epoxy resin. Instead of hydrogen gas, the liner 11 may be filled with other fuel gases. Examples of such fuel gases include compressed gases such as compressed natural gas (CNG) and various liquefied gases such as liquefied natural gas (LNG) and liquefied petroleum gas (LPG).

The boss 14 is formed by machining a metal material such as aluminum or aluminum alloy into a predetermined shape. A valve 15 that controls the flow of hydrogen gas into and out of the housing space 17 is attached to the boss 14. The valve 15 is provided with a seal member 15a. The seal member 15a contacts the inner surface of the liner 11 in a protruding portion 22a of a dome member 22 described later and seals the housing space 17 of the high-pressure tank 10.

The reinforcing body 20 covers the outer surface of the liner 11 and has a function to reinforce the liner 11 to improve mechanical strength, such as rigidity and pressure resistance, of the high-pressure tank 10. As will be described later, the reinforcing body 20 has a cylindrical cylinder member 21 and two dome members 22, 23 connected to both end portions of the cylinder member 21. The reinforcing body 20 is a member formed by joining the cylinder member 21 and the dome members 22, 23.

The reinforcing body 20 is made of resin and fibers (continuous fibers). In the cylinder member 21, the fibers extend along the entire circumference of the cylinder member 21 at an angle substantially perpendicular to the axial direction X of the cylinder member 21. In other words, the fibers in the cylinder member 21 are oriented in the circumferential direction. The fibers are wound at least once around the liner 11. Since the fibers in the cylinder member 21 are oriented in the circumferential direction of the cylinder member 21, the strength of the fiber-reinforced resin layer 12 against hoop stress that is generated by an internal pressure (gas pressure) is provided by an appropriate amount of fiber-reinforced resin. In the dome members 22, 23, on the other hand, the fibers are not oriented in the circumferential direction of the cylinder member 21 but the fibers extending in various directions crossing the circumferential direction are placed on top of one another. The strength of the fiber-reinforced resin layer 12 against stress that is generated by the internal pressure (gas pressure) is therefore provided by an appropriate amount of fiber-reinforced resin in the dome members 22, 23.

In the present embodiment, the fibers in the cylinder member 21 are not continuous with (not connected to) the fibers in the dome members 22, 23. As will be described later, the cylinder member 21 and the two dome members 22, 23 are formed separately, and the two dome members 22, 23 are then attached to both end portions of the cylinder member 21.

The second reinforcing layer 13 covers the outer surface of the reinforcing body 20. The second reinforcing layer 13 covers the entire dome members 22, 23. The second reinforcing layer 13 is made of resin and fibers (continuous fibers). The fibers in the second reinforcing layer 13 are oriented parallel to, or obliquely at 45 degrees or less with respect to, the axial direction X of the cylinder member 21 and extend over the cylinder member 21 and across the two dome members 22, 23 located at both ends of the cylinder member 21. These fibers prevent the dome members 22, 23 from moving outward in the axial direction X and thus prevent the dome members 22, 23 from coming off from the cylinder member 21 outward in the axial direction X by the gas pressure.

Figure 3:
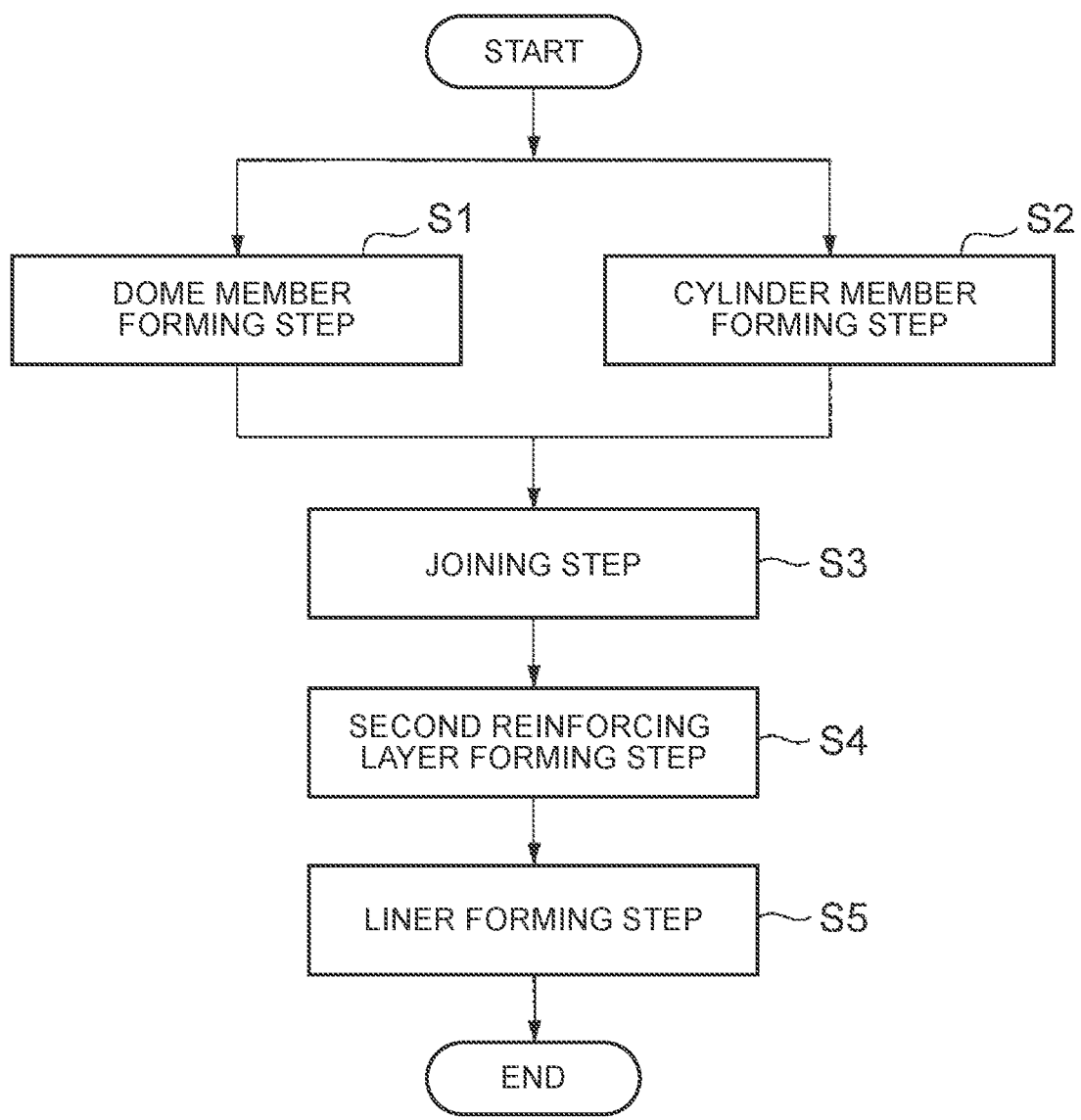
FIG. 3 is a flowchart of the method for manufacturing a high-pressure tank according to the embodiment of the disclosure.

Next, a method for manufacturing the high-pressure tank 10 according to the embodiment of the disclosure will be described. FIG. 3 is a flowchart illustrating the method for manufacturing the high-pressure tank 10. As shown in FIG. 3, the method for manufacturing the high-pressure tank 10 includes a dome member forming step S1, a cylinder member forming step S2, a joining step S3, a second reinforcing layer forming step S4, and a liner forming step S5. Since the dome member forming step S1 and the cylinder member forming step S2 are independent of each other, the steps S1, S2 may be performed either in parallel or sequentially in either order.

Figure 4:
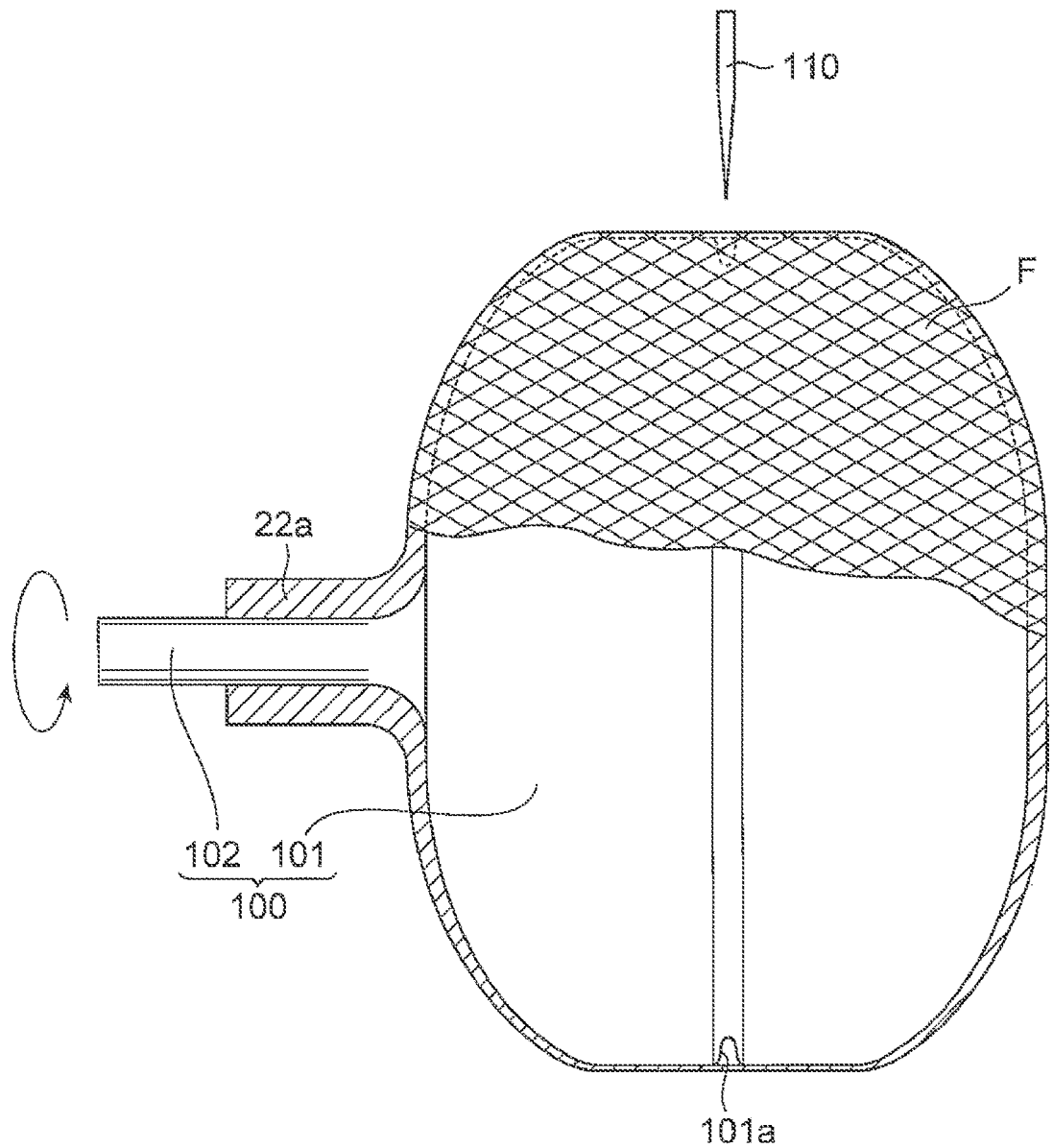
FIG. 4 is a partial sectional view illustrating a dome member forming step of the method for manufacturing a high-pressure tank according to the embodiment of the disclosure.

In the dome member forming step S1, as shown in FIG. 4, a resin-impregnated fiber bundle F is wound around the outer surface of a mandrel (predetermined die) 100 by, e.g., filament winding (FW process). Specifically, the mandrel 100 has a main body 101 and a shaft portion 102 extending outward from one end of the main body 101. The main body 101 has a circular shape as viewed in the axial direction of the shaft portion 102. The main body 101 has a groove 101a in the middle in the axial direction. The groove 101a is formed in the outer peripheral surface of the main body 101 and extends along the entire circumference of the main body 101. The shaft portion 102 is rotatably supported by a rotation mechanism (not shown).

The mandrel 100 is rotated to wind the fiber bundle F such that the fiber bundle F covers the outer surface of the mandrel 100. At this time, the fiber bundle F is also wound around the outer surface of the shaft portion 102 to form the cylindrical protruding portion 22a with a through hole 22b (see FIG. 5). The fiber bundle F is wound at, e.g., 40 degrees with respect to the axial direction of the shaft portion 102. The material of the mandrel 100 is not particularly limited, but is preferably metal in order for the mandrel 100 to be strong enough not to deform when the fiber bundle F is wound around the mandrel 100.

The resin with which the fiber bundle F is impregnated is not particularly limited, but is, e.g., a thermosetting resin. Preferred examples of the thermosetting resin include a phenol resin, a melamine resin, a urea resin, and an epoxy resin, and an epoxy resin is particularly preferable in terms of mechanical strength etc. Epoxy resins are typically resins produced by mixing a prepolymer such as a copolymer of bisphenol A and epichlorohydrin and a curing agent such as a polyamine and thermally curing the mixture. Epoxy resins have fluidity, namely epoxy resins are fluid when uncured and form a strong crosslinked structure when thermally cured. The resin with which the fiber bundle F is impregnated may be a thermoplastic resin. Examples of the thermoplastic resin include polyether ether ketone, polyphenylene sulfide, polyacrylic acid ester, polyimide, and polyamide.

Examples of fibers of the fiber bundle F include glass fibers, aramid fibers, boron fibers, and carbon fibers. Carbon fibers are particularly preferable in terms of lightweightness, mechanical strength, etc.

Figure 5:
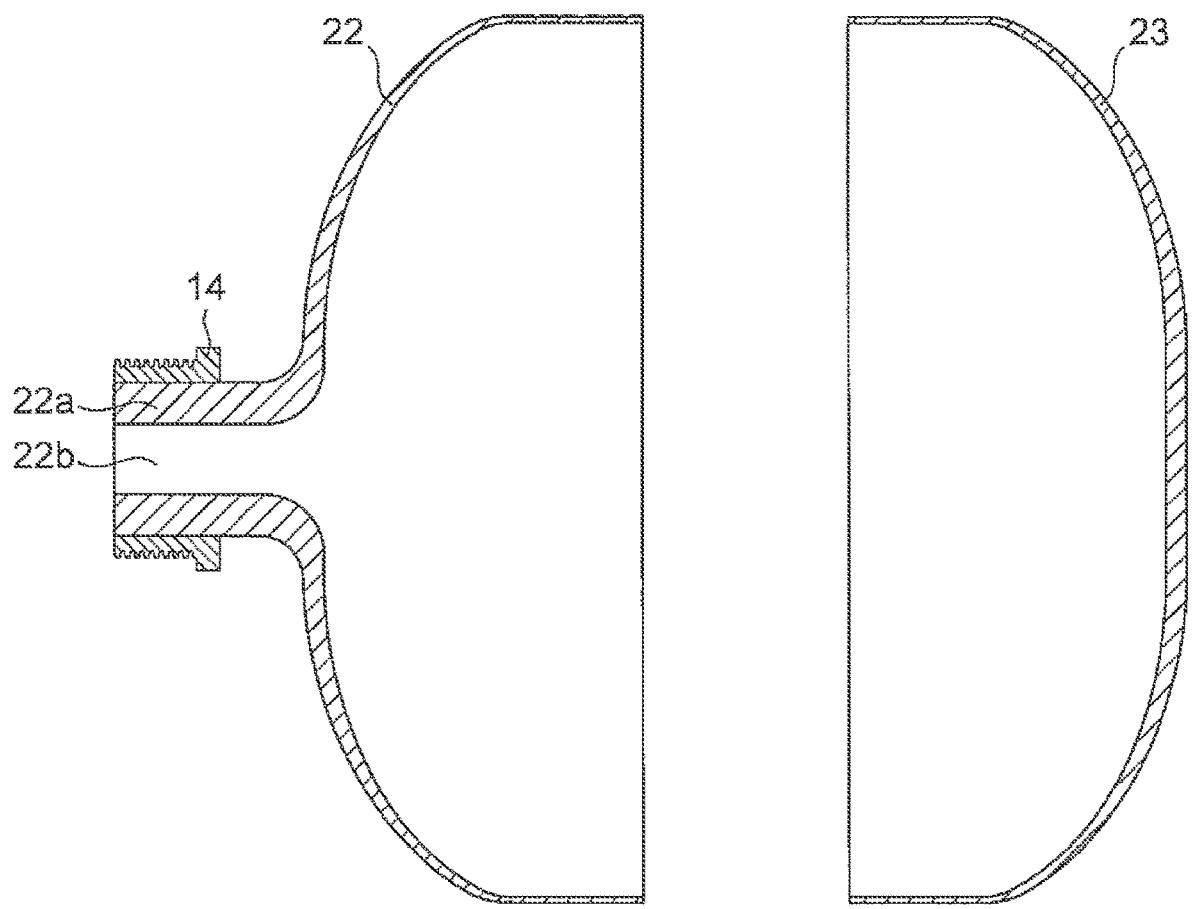
FIG. 5 is a sectional view illustrating a dome member forming step of the method for manufacturing a high-pressure tank according to the embodiment of the disclosure.

Next, the resultant winding body (fiber bundle F) formed on the outer surface of the mandrel 100 is divided into two parts using a cutter 110 (see FIG. 4). As shown in FIG. 5, the two parts were then removed from the mandrel 100. The two dome members 22, 23 are formed in this manner.

Specifically, in the state shown in FIG. 4, the boss 14 is attached to the outer surface of the protruding portion 22a. The resin in the winding body (fiber bundle F) is then solidified, and a blade of the cutter 110 is inserted into the groove 101a of the mandrel 100 while rotating the mandrel 100. The winding body is thus divided into two parts, and the two parts are then removed from the mandrel 100. The two dome members 22, 23 are formed in this manner. The cutter 110 is not particularly limited, but may be, e.g., a rotating disk with a blade along its outer peripheral surface, a thin plate with a blade along its side surface, or a cutter that cuts the fiber bundle F using a laser beam.

Solidifying the resin in the fiber bundle F reduces deformation of the fiber bundle F when cutting with the cutter 110 and reduces deformation of the two dome members 22, 23 when removing from the mandrel 100.

The process of solidifying the resin in the fiber bundle F is not particularly limited. However, for example, when the resin in the fiber bundle F (that is, the resin in the two dome members 22, 23) is a thermosetting resin, the resin may be precured. Precuring conditions (temperature and time), which vary depending on the type of resin in the fiber bundle F, are set so that the viscosity of the precured resin in the fiber bundle F is higher than that of the resin in the fiber bundle F when the fiber bundle F is wound on the mandrel 100 (viscosity before precuring). In this example, the resin in the fiber bundle F is precured until the resin in the fiber bundle F is no longer fluid.

The viscosity of the resin in the fiber bundle F when cutting with the cutter 110 and when removing from the mandrel 100 is preferably 0.05 to 100 Pa·s. With the viscosity being 0.05 Pa·s or higher, the deformation of the fiber bundle F when cutting with the cutter 110 and when removing from the mandrel 100 is sufficiently reduced. Moreover, with the viscosity being 100 Pa·s or lower, a large part of the resin in the fiber bundle F remains uncured. The presence of this uncured part restrains reduction in adhesive strength between the cylinder member 21 and the two dome members 22, 23 when curing the cylinder member 21 and the two dome members 22, 23 in a later step. Moreover, since the heating time of the resin is reduced, the manufacturing time of the dome members 22, 23 is reduced. The precuring conditions include heating for 10 to 120 minutes at temperatures higher than the gelation temperature of the resin with which the fiber bundle F is impregnated. For example, in the case where the fiber bundle F is impregnated with an epoxy resin, the precuring conditions may be 100 to 170° C. and 10 to 120 minutes.

The higher the viscosity of the resin in the fiber bundle F is, the more the deformation of the fiber bundle F when cutting with the cutter 110 is reduced and the more the deformation of the dome members 22, 23 when removing from the mandrel 100 is reduced. The resin in the fiber bundle F may be cured completely (e.g., until physical properties such as Young's modulus become stable) (complete curing). In this case, however, the manufacturing time of the dome members 22, 23 is increased. It is therefore desirable to stop heating and allow to cool when the resin in the fiber bundle F reaches such a viscosity that the two parts can be easily removed from the mandrel 100 (e.g., 0.05 Pa·s) or higher. "Thermal curing" in the specification and the claims represents a concept including precuring and complete curing.

When the resin in the fiber bundle F is a thermoplastic resin, the resin in the fiber bundle F may be solidified by cooling the fiber bundle F when the resin has fluidity, i.e., the resin is fluid. In this case as well, the deformation of the fiber bundle F when cutting with the cutter 110 is reduced, and the deformation of the fiber bundle F when removing the two dome members 22, 23 from the mandrel 100 is also reduced.

In the example described above, the fiber bundle F is cut with the cutter 110 after solidifying the resin in the fiber bundle F. However, the fiber bundle F may be cut with the cutter 110 without solidifying the resin in the fiber bundle F. In this case, the resin in the fiber bundle F may be solidified after cutting the fiber bundle F with the cutter 110.

It is not essential to solidify the resin in the fiber bundle F. However, in the case where the resin in the fiber bundle F is not solidified, the resin is sticky, and it is difficult to remove the fiber bundle F from the mandrel 100 (the fiber bundle F tends to be deformed). It is therefore preferable to, e.g., apply a release agent to the surface of the mandrel 100 before winding the fiber bundle F around the mandrel 100 or remove the two dome members 22, 23 from the mandrel 100 at a reduced speed in order to reduce the deformation of the fiber bundle F.

In the example described above, the boss 14 is attached to the outer surface of the protruding portion 22a after winding the fiber bundle F around the outer surface of the mandrel 100. However, a boss may be attached in advance to the joint portion between the main body 101 and the shaft portion 102 of the mandrel 100, and the fiber bundle F may be wound around the outer surface of the mandrel 100 with the boss attached to the joint portion. In this case, a part of the boss is covered with and held by the fiber bundle F. The boss can thus be firmly fixed by the fiber bundle F.

Figure 6:
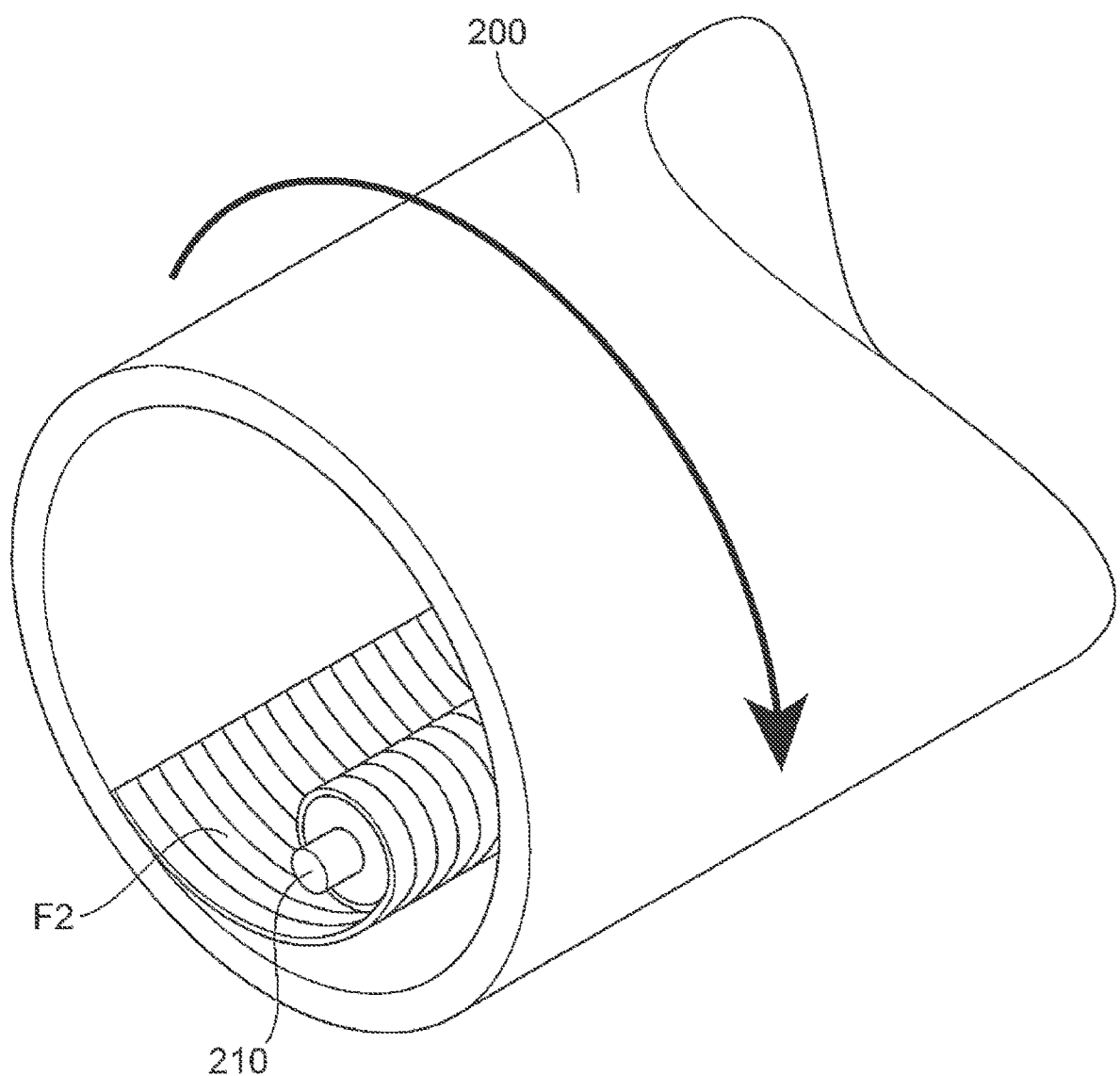
FIG. 6 is a perspective view illustrating a cylinder member forming step of the method for manufacturing a high-pressure tank according to the embodiment of the disclosure.

In the cylinder member forming step S2, as shown in FIG. 6, the cylinder member 21 is formed by what is called centrifugal winding (CW process), namely by attaching a fiber sheet F2 to the inner surface of a rotating cylindrical die 200. Specifically, the cylindrical die 200 is rotated at a predetermined rotational speed by a rotation mechanism (not shown). The material of the cylindrical die 200 is not particularly limited, but is preferably metal in order for the cylindrical die 200 to be strong enough not to deform when the fiber sheet F2 is attached to the cylindrical die 200.

A feed roller 210 of a feed device (not shown) that feeds the fiber sheet F2 from a roll of the fiber sheet F2 is disposed in the cylindrical die 200. The fiber sheet F2 is fed while rotating the cylindrical die 200. The fiber sheet F2 is thus attached to the inner surface of the cylindrical die 200. The cylinder member 21 is formed in this manner.

The fiber sheet F2 has at least fibers oriented in the circumferential direction of the feed roller 210. The cylinder member 21 having fibers oriented in the circumferential direction can thus be obtained.

Examples of the fiber sheet F2 include what is called a uni-direction (UD) sheet formed by interlacing a plurality of fiber bundles aligned in a single direction with restraining yarn, and a fiber sheet formed by interlacing a plurality of fiber bundles aligned in a single direction with a plurality of fiber bundles crossing these fiber bundles, e.g., oriented perpendicularly to these fiber bundles.

The fiber sheet F2 may be a fiber sheet not pre-impregnated with resin or a fiber sheet pre-impregnated with resin. In the case where the fiber sheet F2 is a fiber sheet not pre-impregnated with resin, the fiber sheet F2 is fed to the inner surface of the rotating cylindrical die 200 by the feed roller 210. With the fiber sheet F2 thus attached to the inner surface of the cylindrical die 200 by centrifugal force and friction force, resin is poured into the cylindrical die 200 to impregnate the fiber sheet F2 with the resin. Alternatively, resin may be poured into the cylindrical die 200 while feeding the fiber sheet F2. Specifically, the fiber sheet F2 may be impregnated with resin while attaching the fiber sheet F2 to the inner surface of the cylindrical die 200. In the case where the fiber sheet F2 is a fiber sheet not pre-impregnated with resin or in the case where the fiber sheet F2 is a fiber sheet pre-impregnated with resin, air bubbles can be removed from the fiber sheet F2 by centrifugal force by rotating the cylindrical die 200 with the fiber sheet F2 being heated as necessary so that the resin has fluidity, i.e. the resin is fluid. This debubbling process is performed as necessary.

The resin with which the fiber sheet F2 is impregnated is not particularly limited, but is, e.g., a thermosetting resin. Like the fiber bundle F, preferred examples of the thermosetting resin include a phenol resin, a melamine resin, a urea resin, and an epoxy resin, and an epoxy resin is particularly preferable in terms of mechanical strength etc.

Like the fiber bundle F, examples of the fibers of the fiber sheet F2 include glass fibers, aramid fibers, boron fibers, and carbon fibers, and carbon fibers are particularly preferable in terms of lightweightness, mechanical strength, etc.

Figure 7:
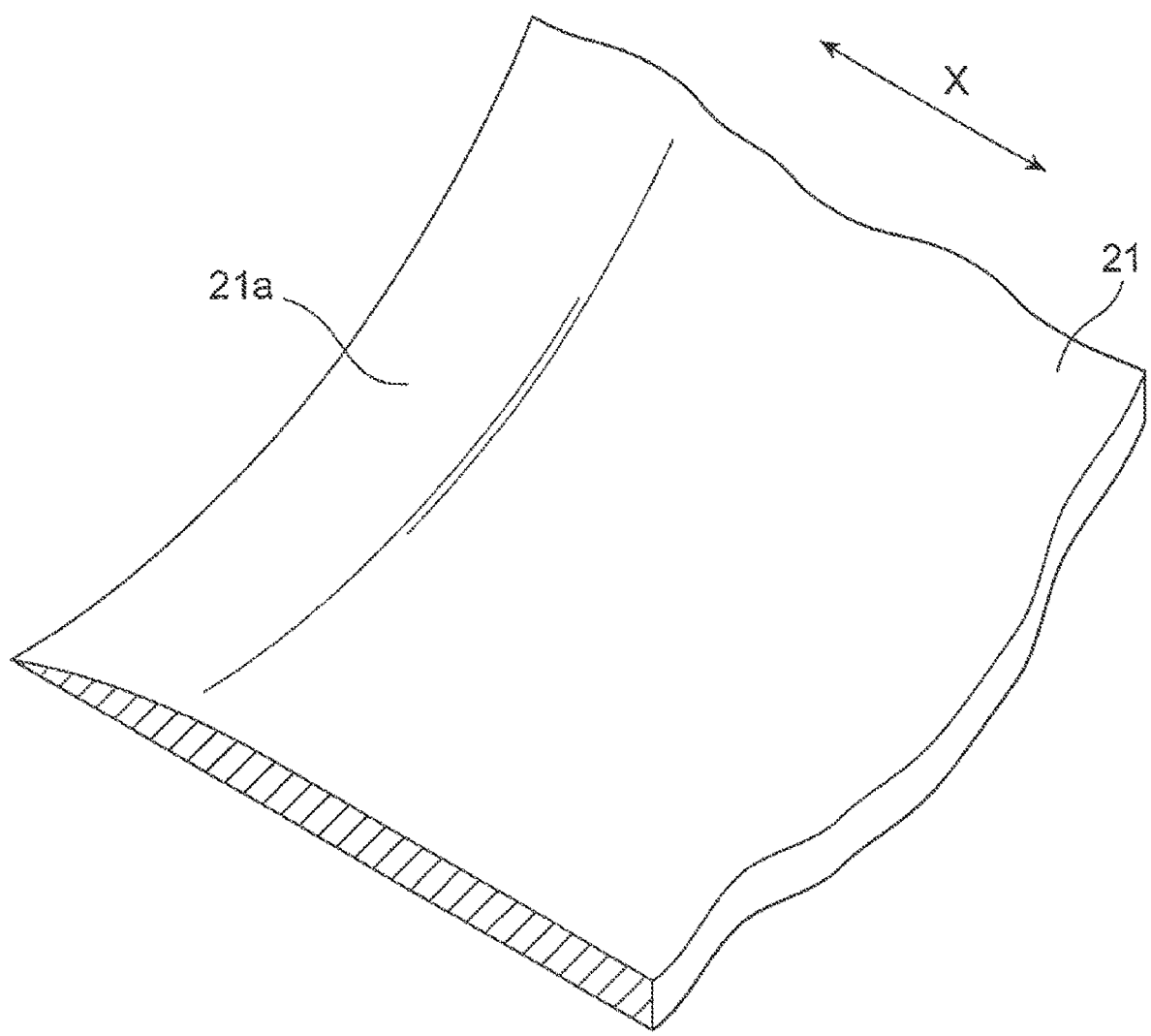
FIG. 7 is a perspective view illustrating the cylinder member forming step of the method for manufacturing a high-pressure tank according to the embodiment of the disclosure, showing a part of an end portion in the axial direction of a cylinder member.

As shown in FIG. 7, the end portions in the axial direction X of the cylinder member 21 formed on the inner surface of the cylindrical die 200 become gradually thinner towards the edges in the axial direction X of the cylinder member 21. As shown in FIG. 2, steps are therefore less likely to be formed at the joint portion between the outer surface of the cylinder member 21 and the outer surfaces of the two dome members 22, 23 when the cylinder member 21 is combined with the two dome members 22, 23. This reduces formation of voids between the second reinforcing layer 13 and the reinforcing body 20 due to the steps at the joint portion between the cylinder member 21 and the two dome members 22, 23.

In order to make both end portions in the axial direction X of the cylinder member 21 gradually thinner toward the edges in the axial direction X of the cylinder member 21, the fiber bundles in the end portions in the axial direction X (lateral direction) of the fiber sheet F2 are preferably interlaced such that the thickness of the fiber bundles becomes gradually smaller toward the edges in the axial direction X of the fiber sheet F2. Both end portions in the axial direction X of the cylinder member 21 may be made gradually thinner toward the edges in the axial direction X of the cylinder member 21 by pressing both end portions in the axial direction X of the cylinder member 21 by rollers etc. Even when a plurality of layers of the fiber sheet F2 is formed on the inner surface of the cylindrical die 200, the fiber bundles and the resin are pressed radially outward against the inner surface of the cylindrical die 200 due to the centrifugal force generated by rotation of the cylindrical die 200, no gap in the thickness direction is left in the end portions of the layers of the fiber sheet F2.

Thereafter, the cylinder member 21 is removed from the cylindrical die 200. At this time, the cylinder member 21 is solidified and then separated from the inner surface of the cylindrical die 200. Solidifying the cylinder member 21 reduces deformation of the cylinder member 21 when removing from the cylindrical die 200.

As in the case of the fiber bundle F in the dome member forming step S1, the process of solidifying the cylinder member 21 is not particularly limited. However, for example, when the resin of the cylinder member 21 (that is, the fiber sheet F2) is a thermosetting resin, the resin may be precured. Precuring conditions (temperature and time), which vary depending on the type of resin of the cylinder member 21, are set so that the viscosity of the precured resin of the cylinder member 21 is higher than that of the resin of the fiber sheet F2 fed on the cylindrical die 200 (or the resin poured into the cylindrical die 200). In this example, the resin in the fiber sheet F2 is precured until the resin in the fiber sheet F2 is no longer fluid. It is preferable to precure the resin while rotating the cylindrical die 200. Regardless of whether the fiber sheet F2 is a fiber sheet pre-impregnated with resin or a fiber sheet not pre-impregnated with resin, air is present between the fiber sheet F2 and the cylindrical die 200 or between the layers of the fiber sheet F2 when the fiber sheet F2 is formed on the inner surface of the cylindrical die 200. By rotating the cylindrical die 200 when precuring the resin having a reduced viscosity due to heat, the air can be removed by the centrifugal force generated by the rotation of the cylindrical die 200. This reduces formation of voids in the cylinder member 21.

The viscosity of the resin of the cylinder member 21 when removing from the cylindrical die 200 is preferably 0.05 to 100 Pa·s. With the viscosity being 0.05 Pa·s or higher, the deformation of the cylinder member 21 when removing from the cylindrical die 200 is sufficiently reduced. With the viscosity being 100 Pa·s or lower, a large part of the resin of the cylinder member 21 remains uncured. The presence of this uncured part restrains reduction in adhesive strength between the cylinder member 21 and the two dome members 22, 23 when curing the cylinder member 21 and the two dome members 22, 23 in a later step. Moreover, since the heating time of the resin is reduced, the manufacturing time of the cylinder member 21 is reduced. The precuring conditions include heating for 10 to 120 minutes at temperatures higher than the gelation temperature of the resin with which the fiber sheet F2 is impregnated. For example, in the case where the fiber sheet F2 is impregnated with an epoxy resin, the precuring conditions may be 100 to 170° C. and 10 to 120 minutes.

The higher the viscosity of the resin of the cylinder member 21 is, the more the deformation of the cylinder member 21 when removing from the cylindrical die 200 is reduced. The resin of the cylinder member 21 may be cured completely (e.g., until physical properties such as Young's modulus become stable) (complete curing). In this case, however, the manufacturing time of the cylinder member 21 is increased. It is therefore desirable to stop heating and allow to cool when the resin of the cylinder member 21 reaches such a viscosity that the cylinder member 21 can be easily removed from the cylindrical die 200 (e.g., 0.05 Pa·s) or higher.

When the resin of the cylinder member 21 is a thermoplastic resin, the cylinder member 21 may be solidified by cooling the cylinder member 21 when the resin has fluidity, i.e., the resin is fluid. In this case as well, the deformation of the cylinder member 21 when removing from the cylindrical die 200 is reduced.

It is not essential to solidify the cylinder member 21. However, in the case where the cylinder member 21 is not solidified, the cylinder member 21 is sticky and it is difficult to remove the cylinder member 21 from the cylindrical die 200 (the cylinder member 21 tends to be deformed). It is therefore preferable to, e.g., apply a release agent to the inner surface of the cylindrical die 200 before attaching the fiber sheet F2 to the inner surface of the cylindrical die 200 or remove the cylinder member 21 from the cylindrical die 200 at a reduced speed in order to reduce the deformation of the cylinder member 21. Alternatively, the cylindrical die 200 may be composed of a plurality of members that can be separated in the radial direction, and the cylindrical die 200 may be removed from the cylinder member 21 little by little (one member by one member).

In the example described above, the cylinder member 21 is formed on the inner surface of the cylindrical die 200. However, the cylinder member 21 may be formed by other methods. For example, the cylinder member 21 may be formed by attaching the fiber sheet F2 to the outer surface of a cylindrical die or by hoop-winding a resin-impregnated fiber bundle around the cylindrical die by the FW process. However, in the case where the cylinder member 21 is thermally cured (precured or completely cured) or cooled, the cylinder member 21 shrinks during curing or due to temperature decrease and it becomes difficult to remove the cylinder member 21 from the outer surface of the cylindrical die. It is therefore preferable to form the cylinder member 21 on the inner surface of the cylindrical die 200.

As described above, in the cylinder member forming step S2, the cylinder member 21 made of a fiber-reinforced resin and having fibers oriented in the circumferential direction is formed using the cylindrical die 200. Since the fibers in the cylinder member 21 are oriented in the circumferential direction, the strength of the fiber-reinforced resin layer 12 against the hoop stress that is generated by the gas pressure is provided by an appropriate amount of fiber-reinforced resin. In the dome member forming step S1, the two dome members 22, 23 are formed using the mandrel 100. The dome members 22, 23 are thus formed separately from the cylinder member 21 by using an appropriate amount of fiber-reinforced resin. The usage of the fiber-reinforced resin for the cylinder member 21 is therefore not increased due to formation of the dome members 22, 23.

The dome members 22, 23 are formed using the mandrel 100, and the cylinder member 21 is formed using the cylindrical die 200. Accordingly, the cylinder member 21 and the dome members 22, 23 are formed without directly winding the fiber bundle etc. around the liner 11. Since the liner 11 is not subjected to a tightening force due to hoop winding, helical winding, etc., it is not necessary to increase the strength of the liner 11 so that the liner 11 is not deformed by the tightening force. The thickness (wall thickness) of the liner 11 can therefore be reduced. Accordingly, the capacity of the liner 11 can be increased and the weight of the liner 11 can be reduced.

Reducing the thickness of the liner 11 also has the following effects. For example, when gas is continuously used at a pressure close to the lower limit gas pressure (the lower limit of the normal use range) of the high-pressure tank 10, the liner 11 may thermally contract due to decreases in temperature and internal pressure caused by adiabatic expansion. However, by reducing the thickness of the liner 11, the liner 11 more easily expands due to the internal pressure, and thermal contraction of the liner 11 is therefore reduced. Accordingly, the lower limit gas pressure can be set to a lower value, and a larger amount of gas can be discharged from the high-pressure tank 10.

Figure 8:
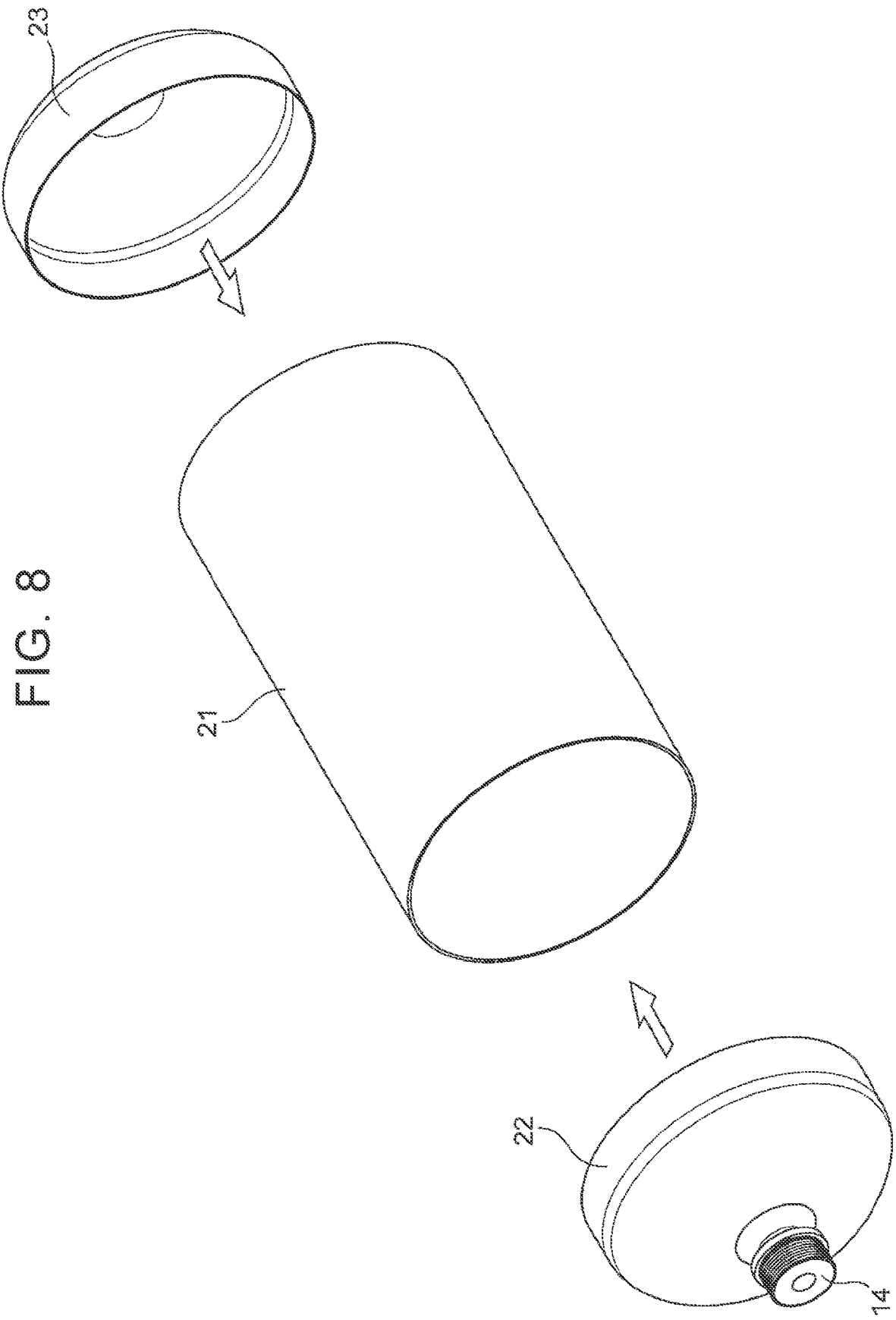
FIG. 8 is a perspective view illustrating a joining step of the method for manufacturing a high-pressure tank according to the embodiment of the disclosure.
Figure 9:
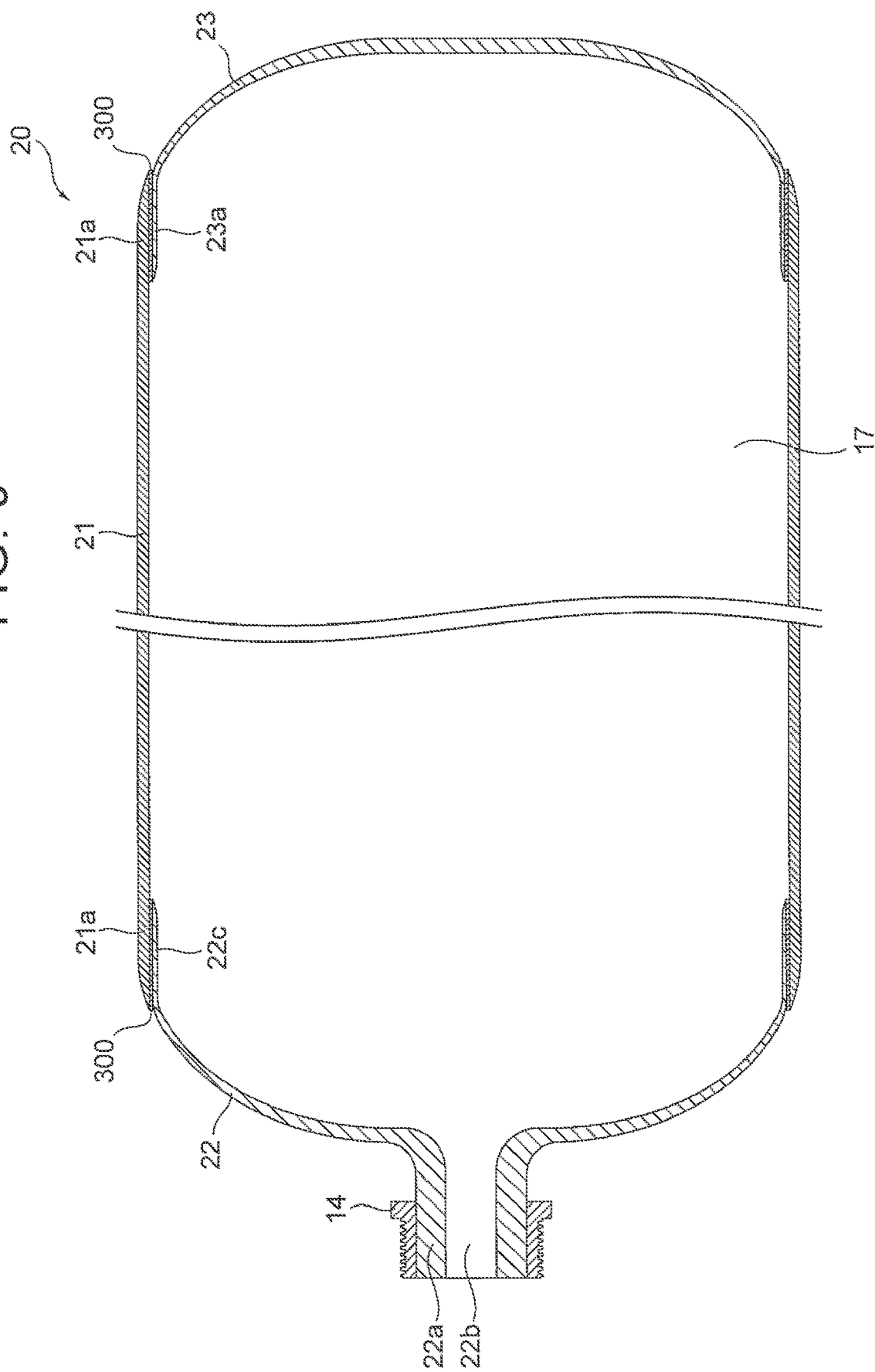
FIG. 9 is a sectional view illustrating the joining step of the method for manufacturing a high-pressure tank according to the embodiment of the disclosure.

In the joining step S3, as shown in FIGS. 8 and 9, both end portions 21a of the cylinder member 21 and end portions 22c, 23a of the two dome members 22, 23 are joined to form the reinforcing body 20 that is the first reinforcing layer.

Specifically, the end portion 22c of the dome member 22 and the end portion 23a of the dome member 23 are fitted in the end portions 21a of the cylinder member 21. Since the end portions 21a of the cylinder member 21, the end portion 22c of the dome member 22, and the end portion 23a of the dome member 23 have a cylindrical shape, the end portion 22c of the dome member 22 and the end portion 23a of the dome member 23 contact the end portions 21a of the cylinder member 21 along the entire circumference. An adhesive 300 (see FIG. 9) may be applied between the cylinder member 21 and the dome members 22, 23. This configuration further restrains the dome members 22, 23 from coming off from the cylinder member 21 in a later step. Moreover, since the adhesive 300 fills the gaps between the cylinder member 21 and the dome members 22, 23, a resin material for the liner 11 is prevented from flowing into the gaps between the cylinder member 21 and the dome members 22, 23 in the liner forming step S5. The material of the adhesive 300 is not particularly limited, but is preferably, e.g., a thermosetting resin such as an epoxy resin. The adhesive 300 may be a resin having the same components as those of the cylinder member 21 or the dome members 22, 23. Even when the adhesive 300 is not used, the resin contained in the second reinforcing layer 13 oozes from the second reinforcing layer 13 and fills the gaps between the cylinder member 21 and the dome members 22, 23 during curing in the second reinforcing layer forming step S4. The resin material for the liner 11 is therefore restrained from flowing into the gaps between the cylinder member 21 and the dome members 22, 23 in the liner forming step S5.

It is preferable that the dome members 22, 23 whose end portions 22c, 23a are to be located inside the end portions 21a of the cylinder member 21 when fitting the dome members 22, 23 and the cylinder member 21 together be thermally cured (precured or completely cured) in advance. The strength of the dome members 22, 23 is thus increased in advance by the thermal curing. Accordingly, when fitting the dome members 22, 23 and the cylinder member 21 together, the end portions 21a of the cylinder member 21 conform to the end portions 22c, 23a of the dome members 22, 23, and the dome members 22, 23 function as guide portions. The cylinder member 21 and the dome members 22, 23 can thus be easily fitted together. In the case where the cylinder member 21 whose end portion 21a are to be located outside the end portions 22c, 23a of the dome members 22, 23 is not thermally cured in advance, the cylinder member 21 may be deformed when fitting the cylinder member 21 and the dome members 22, 23 together. However, even when such deformation of the cylinder member 21 occurs, the outer shape of the cylinder member 21 can be adjusted as shown in FIG. 7 or the cylinder member 21 can be brought into close contact with the dome members 22, 23, because the cylinder member 21 can be pressed from the outside. The boss 14 is attached to the dome member 22, and the reinforcing body 20 and the second reinforcing layer 13 are supported by the boss 14 in a later step. It is therefore preferable that the dome member 22 have increased strength so that it can support the boss 14, the reinforcing body 20, and the second reinforcing layer 13. Accordingly, it is effective to thermally cure the dome member 22 in advance.

Figure 10:
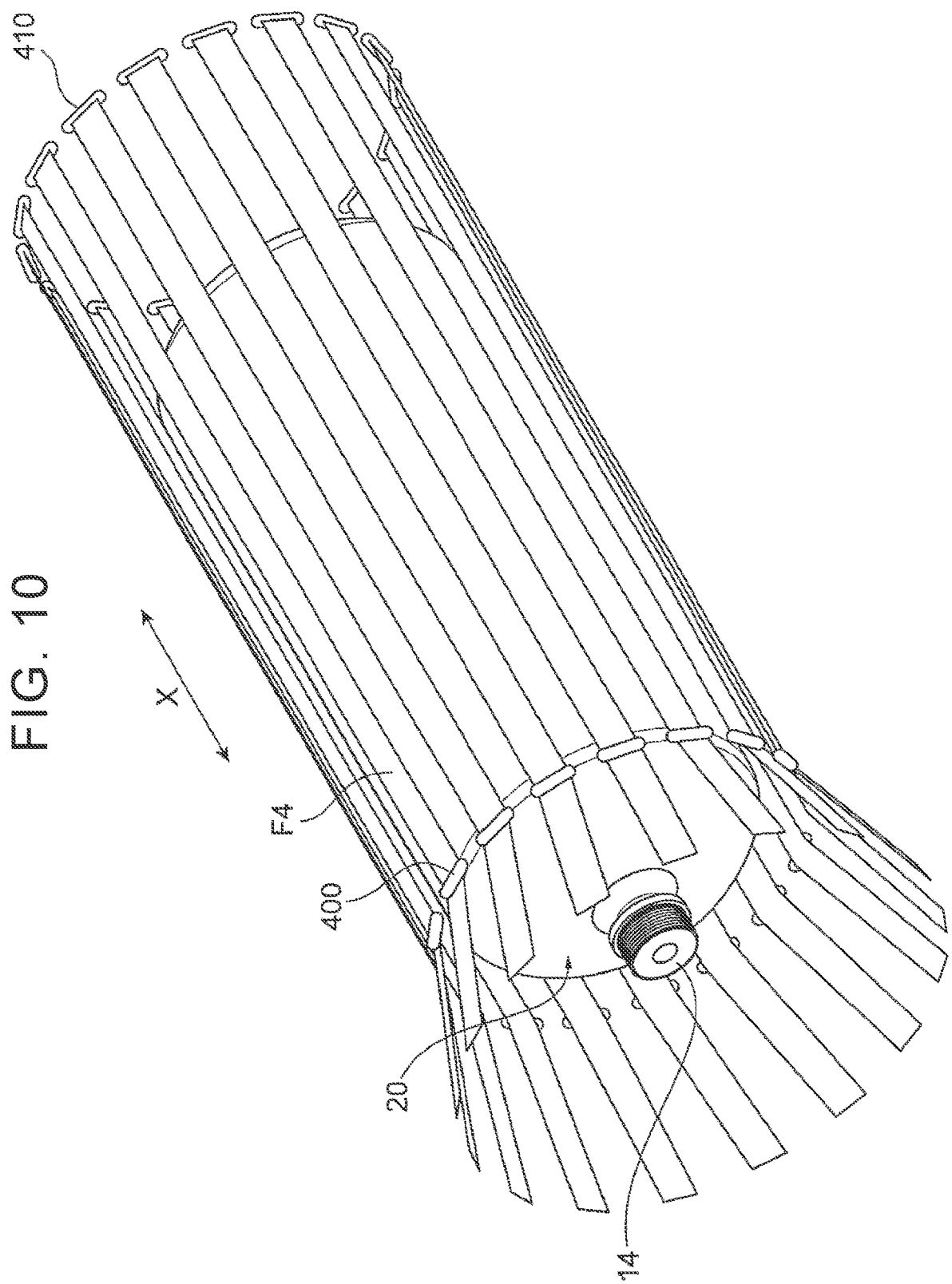
FIG. 10 is a perspective view illustrating a second reinforcing layer forming step of the method for manufacturing a high-pressure tank according to the embodiment of the disclosure.
Figure 11:
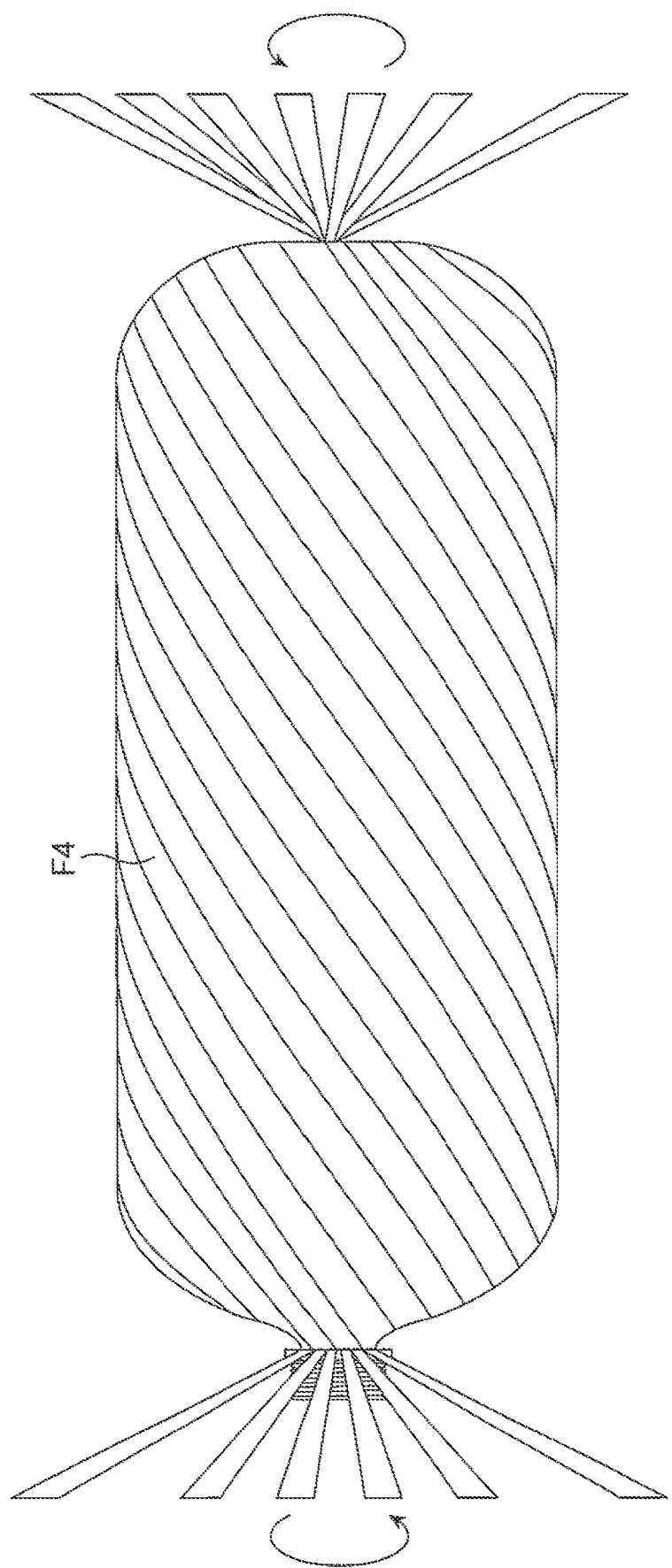
FIG. 11 is a perspective view illustrating the second reinforcing layer forming step of the method for manufacturing a high-pressure tank according to the embodiment of the disclosure.

In the second reinforcing layer forming step S4, the second reinforcing layer 13 made of a fiber-reinforced resin and having fibers placed across the two dome members 22, 23 is formed so as to cover the outer surface of the reinforcing body 20. The fiber-reinforced resin layer 12 having the reinforcing body 20 and the second reinforcing layer 13 is formed in this manner. The second reinforcing layer 13 can be formed by, e.g., methods shown in FIGS. 10 and 11. Specifically, a support mechanism (not shown) is attached to the boss 14 mounted on the reinforcing body 20 so that the support mechanism holds the reinforcing body 20. FIGS. 10 and 11 illustrate the reinforcing body 20 placed horizontally. The reinforcing body 20 may be placed vertically in order to prevent the reinforcing body 20 from bending downward under gravity.

A plurality of resin-impregnated fiber bundles F4 is then placed over the reinforcing body 20 such that the fiber bundles F4 extend in the axial direction X of the reinforcing body 20 at predetermined angular intervals in the circumferential direction of the reinforcing body 20 and at a predetermined distance from the outer surface of the reinforcing body 20. At this time, the fiber bundles F4 are fed through feed parts 400 of a feed device, and the distal ends of the fiber bundles F4 are held by holding members 410.

The resin with which the fiber bundles F4 are impregnated is not particularly limited, but is, e.g., a thermosetting resin. Like the fiber bundle F, preferred examples of the thermosetting resin include a phenol resin, a melamine resin, a urea resin, and an epoxy resin, and an epoxy resin is particularly preferable in terms of mechanical strength etc.

Like the fiber bundle F, examples of fibers of the fiber bundles F4 include glass fibers, aramid fibers, boron fibers, and carbon fibers, and carbon fibers are particularly preferable in terms of lightweightness, mechanical strength, etc.

Thereafter, in the state shown in FIG. 10, the feed parts 400 and the holding members 410 are rotated in opposite directions in the circumferential direction of the reinforcing body 20. The portions on a first end side (feed part 400 side) of the fiber bundles F4 and the portions on a second end side (holding member 410 side) of the fiber bundles F4 are thus rotated relative to each other in the circumferential direction of the reinforcing body 20. In this example, the portions on the first end side of the fiber bundles F4 are rotated in a first direction, and the portions on the second end side of the fiber bundles F4 are rotated in a second direction opposite to the first direction. As shown in FIG. 11, the fiber bundles F4 are thus tilted with respect to the axial direction X of the cylinder member 21, and the gaps between the fiber bundles F4 are eliminated and the fiber bundles F4 partially overlap each other. The fiber bundles F4 gradually approach the outer surface of the reinforcing body 20 and are placed onto the outer surface of the reinforcing body 20 with no gap between the fiber bundles F4. At this time, the fiber bundles F4 tilted with respect to the axial direction X are brought into close contact with the outer surface of the cylinder member 21, and movement of those portions of the fiber bundles F4 which are in close contact with the outer surface of the cylinder member 21 is restricted due to the adhesive force of the resin. The portions on the first end side of the fiber bundles F4 and the portions on the second end side of the fiber bundles F4 are then twisted by the feed parts 400 and the holding members 410 outside the end portions of the cylinder member 21 and thus wound around the outer surfaces of the dome members 22, 23. In this manner, the second reinforcing layer 13 is formed so as to cover the outer surface of the reinforcing body 20. Thereafter, unnecessary portions of the fiber bundles F4 are cut away. The first layer of the fiber bundles F4 is thus formed.

The fiber bundles F4 are provided in order to prevent the dome members 22, 23 from coming off from the cylinder member 21 outward in the axial direction X by the gas pressure. The fiber bundles F4 are therefore placed in the axial direction X of the cylinder member 21. The tilt angle of the fiber bundles F4 (the angle of the fiber bundles F4 with respect to the axial direction X of the cylinder member 21) is not particularly limited, but the fiber bundles F4 are oriented preferably at an angle larger than 0 degrees and equal to or smaller than 45 degrees, more preferably at an angle larger than 0 degrees and equal to or smaller than 20 degrees, with respect to the axial direction X of the cylinder member 21.

Thereafter, the second layer of the fiber bundles F4 is formed by a method similar to that for the first layer. When forming the second layer, the portions on the first end side (feed part 400 side) of the fiber bundles F4 are rotated in the second direction, and the portions on the second end side (the holding member 410 side) of the fiber bundles F4 are rotated in the first direction. In the case where the third and subsequent layers of the fiber bundles F4 are formed, odd-numbered layers (first tilted layers) are formed in a manner similar to that of the first layer, and even-numbered layers (second tilted layers) are formed in a manner similar to that of the second layer.

The number of layers of the fiber bundles F4 is not particularly limited as long as the second reinforcing layer 13 has sufficient strength. However, the number of layers of the fiber bundles F4 is preferably 2 to 12, and more preferably 2. The smaller the number of layers of the fiber bundles F4 is, the more preferable, as long as the second reinforcing layer 13 has sufficient strength. It is preferable that the number of first tilted layers and the number of second tilted layers are the same. The first tilted layer is formed with the fiber bundles F4 being tilted with respect to the axial direction X and subjected to predetermined tension, and is later cured with the fiber bundles F4 in the tilted state. Accordingly, when an expansive force is applied to the second reinforcing layer 13 by the gas pressure, the first tilted layer is subjected to a force in such a direction that the tilt of its fiber bundles F4 with respect to the axial direction X is eliminated. As a result, the reinforcing body 20 is distorted. Similarly, the second tilted layer is formed with the fiber bundles F4 being tilted in the opposite direction to the fiber bundles F4 of the first tilted layer and subjected to predetermined tension, and is later cured with the fiber bundles F4 in the tilted state. Accordingly, when the expansive force is applied to the second reinforcing layer 13 by the gas pressure, the second tilted layer is subjected to a force in such a direction that the tilt of its fiber bundles F4 in the opposite direction to the tilt of the fiber bundles F4 of the first tilted layer is eliminated. As a result, the reinforcing body 20 is distorted. The fiber bundles F4 of the first tilted layer and the fiber bundles F4 of the second tilted layer are tilted in opposite directions. Accordingly, when the expansive force is applied to the second reinforcing layer 13 by the gas pressure, the force in such a direction that the tilt of the fiber bundles F4 of the first tilted layer is eliminated and the force in such a direction that the tilt of the fiber bundles F4 of the second tilted layer is eliminated act to cancel each other out. This reduces distortion of the fiber-reinforced resin layer 12 and therefore reduces distortion of the high-pressure tank 10. This configuration thus restrains reduction in strength of the high-pressure tank 10.

In this example, the number of first tilted layers and the number of second tilted layers are the same. Accordingly, the force in such a direction that the tilt of the fiber bundles F4 of the first tilted layer is eliminated and the force in such a direction that the tilt of the fiber bundles F4 of the second tilted layer is eliminated effectively act to cancel each other out. This effectively reduces distortion of the fiber-reinforced resin layer 12 due to the tilt of the fiber bundles F4 and therefore effectively restrains reduction in strength of the high-pressure tank 10. The number of first tilted layers may be different from the number of second tilted layers. For example, only the first tilted layer(s) or only the second tilted layer(s) may be formed.

A predetermined number of layers of the fiber bundles F4 is formed to form the second reinforcing layer 13. Thereafter, the reinforcing body 20 and the second reinforcing layer 13 are heated and cured, e.g., at 100 to 170° C. for 10 to 120 minutes. At this time, the adhesive 300 permeates into the reinforcing body 20 and the second reinforcing layer 13.

As described above, the second reinforcing layer 13 has fibers placed across the two dome members 22, 23. The fibers of the second reinforcing layer 13 prevent the dome members 22, 23 from being separated from the cylinder member 21. The dome members 22, 23 are thus restrained from coming off from both end portions of the cylinder member 21 by the gas pressure. The amount of fibers in the second reinforcing layer 13 need only be large enough to prevent the dome members 22, 23 from coming off from the cylinder member 21. Accordingly, the usage of the fiber-reinforced resin is reduced as compared to the helical layers in the cylinder section of the conventional high-pressure tank.

According to the second reinforcing layer forming step S4, the second reinforcing layer 13 is formed on the outer surface of the reinforcing body 20 without rotating the reinforcing body 20 in the circumferential direction. It is therefore not necessary to provide a structure for rotating the reinforcing body 20 (typically, a boss to which a rotating shaft is attached) on the opposite end of the high-pressure tank 10 from the through hole 22b.

In the example described above, as shown in FIGS. 10 and 11, the second reinforcing layer 13 is formed on the outer surface of the reinforcing body 20 by rotating the fiber bundles F4 in the circumferential direction of the reinforcing body 20. However, the second reinforcing layer 13 may be formed by other methods. For example, the second reinforcing layer 13 may be formed using what is called sheet winding, namely by winding a resin-impregnated fiber sheet around the outer surface of the reinforcing body 20. In this case, fibers in the fiber sheet are preferably oriented in the axial direction X of the cylinder member 21. However, like the fiber bundles F4, the fibers in the fiber sheet may be oriented at an angle larger than 0 degrees and equal to or smaller than 45 degrees with respect to the axial direction X of the cylinder member 21, or may be oriented at an angle larger than 0 degrees and equal to or smaller than 20 degrees with respect to the axial direction X of the cylinder member 21. In the case where the second reinforcing layer 13 is formed using the fiber bundles F4 or the fiber sheet, the fibers may be oriented parallel to the axial direction X. The second reinforcing layer 13 may be formed on the outer surface of the reinforcing body 20 by the FW process. In the case where the FW process is used, it is preferable to cure the reinforcing body 20 before forming the second reinforcing layer 13 in order to prevent deformation of the reinforcing body 20.

Figure 12:
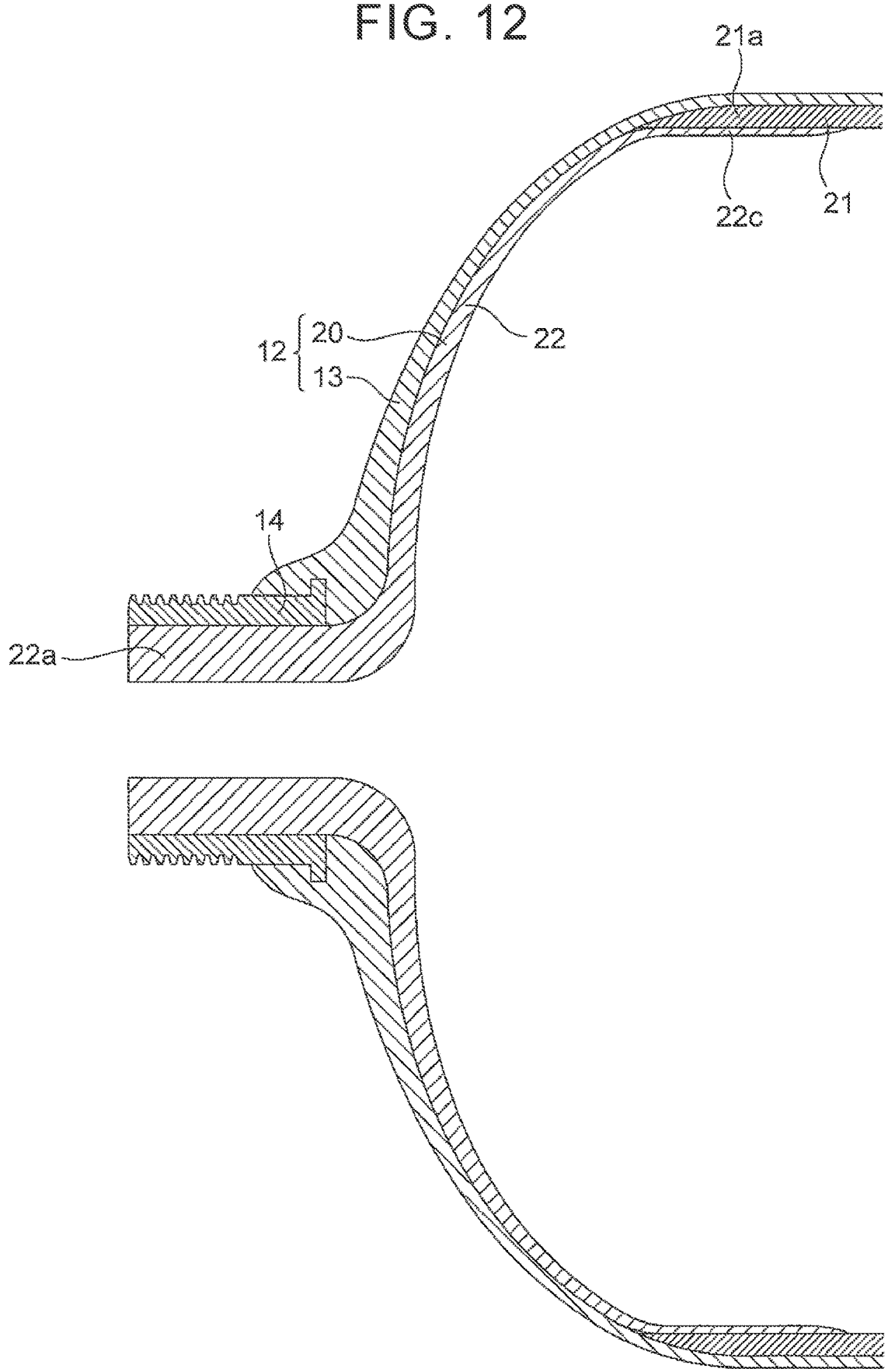
FIG. 12 is a sectional view illustrating a method for manufacturing a high-pressure tank according to a first modification of the disclosure.

In the example described above, as shown in FIG. 2, one end of the second reinforcing layer 13 (the end on the boss 14 side, the first ends of the fiber bundles F4) extends to a position immediately before the boss 14. However, as in a first modification shown in FIG. 12, one end of the second reinforcing layer 13 may cover a part of the outer surface of the boss 14. With this configuration, the boss 14 can be held by the second reinforcing layer 13. The boss 14 is therefore reliably prevented from coming off from the reinforcing body 20.

Figure 13:
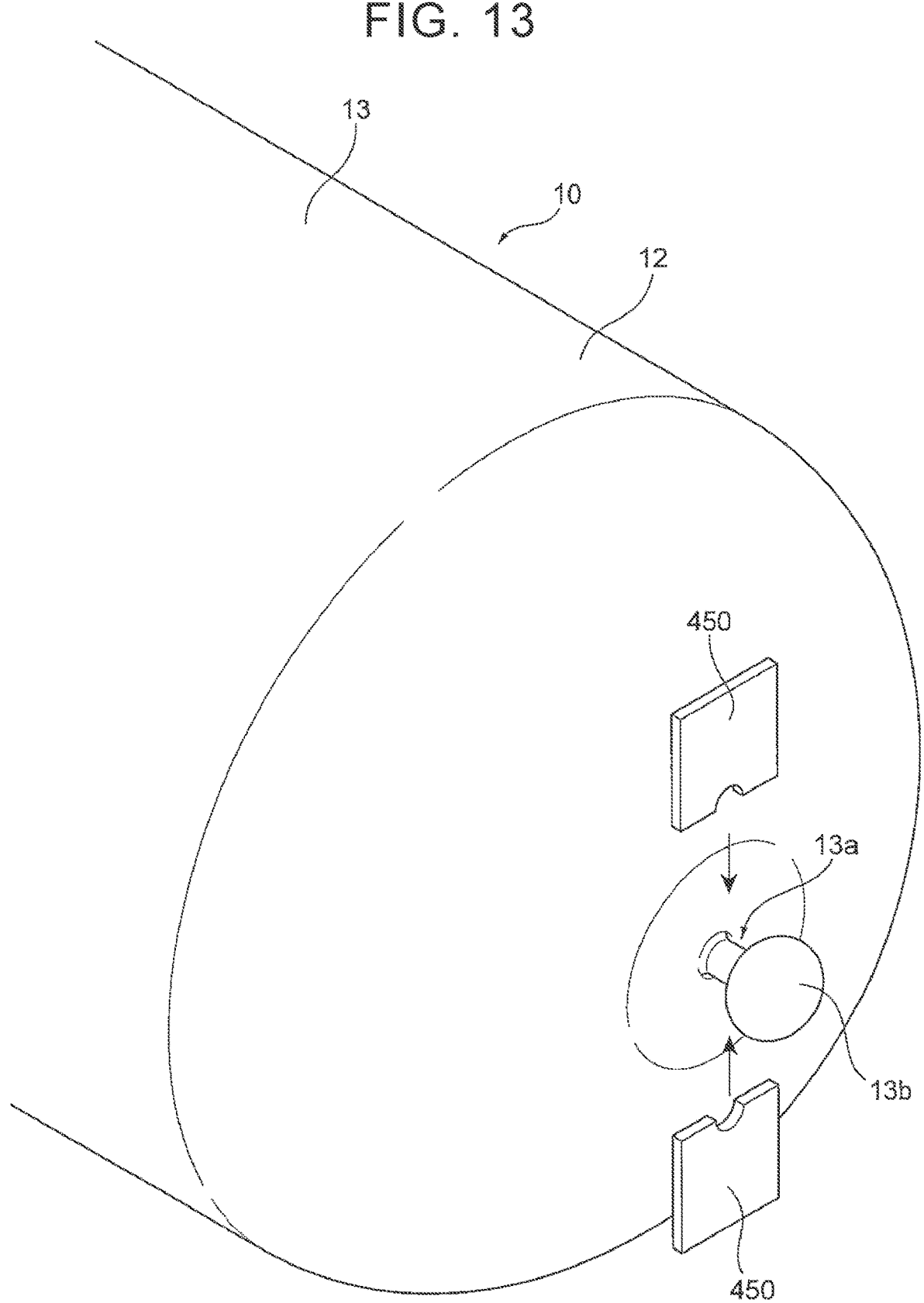
FIG. 13 is a perspective view illustrating a method for manufacturing a high-pressure tank according to a second modification of the disclosure.

In the example described above, as shown in FIG. 1, the other end of the second reinforcing layer 13 (the opposite end from the boss 14, the second ends of the fiber bundles F4) has a smooth, generally spherical surface. However, as in a second modification shown in FIG. 13, the other end of the second reinforcing layer 13 may have a protrusion 13b with a recessed portion 13a. With this configuration, the other end of the second reinforcing layer 13 can be held by, e.g., holding member 450 shown in FIG. 13. This improves workability in a later step and improves mountability of the high-pressure tank 10 on a fuel cell vehicle. The protrusion 13b with the recessed portion 13a can be easily formed by adjusting the cutting position when cutting the fiber bundles F4 in the state shown in FIG. 11.

Figure 14:
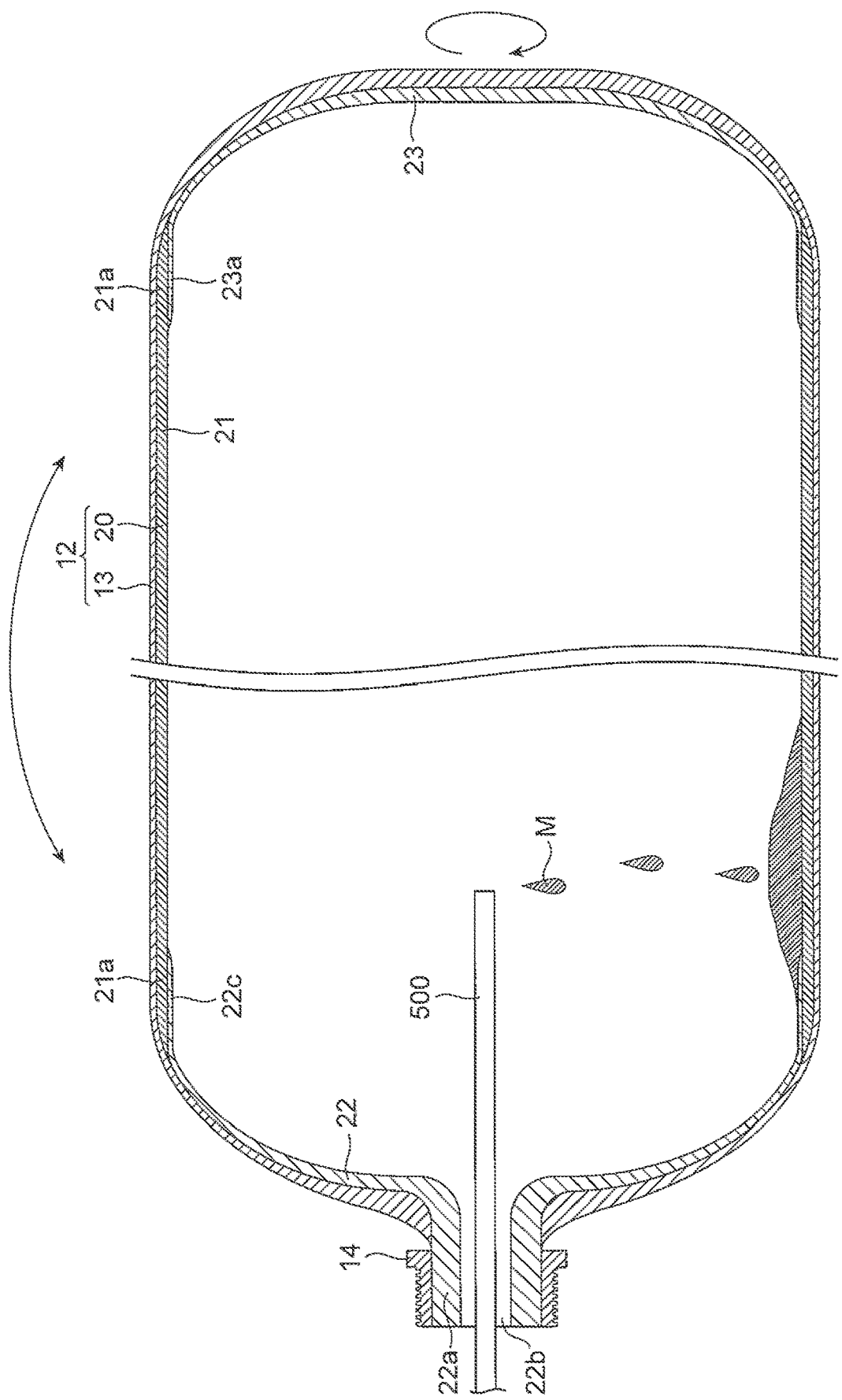
FIG. 14 is a sectional view illustrating a liner forming step of the method for manufacturing a high-pressure tank according to the embodiment of the disclosure.

In the liner forming step S5, as shown in FIG. 14, a resin material M is introduced into the fiber-reinforced resin layer 12 through the through hole 22b in the protruding portion 22a of the reinforcing body 20. The resin material M is then solidified while rotating the fiber-reinforced resin layer 12. The liner 11 is formed in this manner.

Specifically, the internal space of the fiber-reinforced resin layer 12 communicates with the outside through the through hole 22b. A nozzle 500 that discharges the resin material M is inserted through the through hole 22b, and the resin material M is introduced into the internal space of the fiber-reinforced resin layer 12 through the nozzle 500. The nozzle 500 is then removed from the through hole 22b.

As described above, the resin material M is preferably a resin having satisfactory gas barrier properties. Examples of such a resin include thermoplastic resins such as polyamide, polyethylene, ethylene-vinyl alcohol copolymer resin (EVOH), and polyester and thermosetting resins such as epoxy resin, and polyamide is preferred. The resin material M may be a resin material that has fluidity at normal temperature or may be a powdery material.

The reinforcing body 20 is then rotated so that the resin material M covers the inner surface of the reinforcing body 20. Specifically, the internal space of the fiber-reinforced resin layer 12 is heated to a predetermined temperature or higher as necessary. With the resin material M having fluidity of low viscosity (0 to 0.05 Pa·s), the fiber-reinforced resin layer 12 is rotated in the circumferential direction about its axis extending in the horizontal direction, while moving both ends of the fiber-reinforced resin layer 12 alternately up and down (see FIG. 14). As the fiber-reinforced resin layer 12 is rotated, the inner surface of the fiber-reinforced resin layer 12 moves upward with the resin material M having fluidity thereon, and a part of the resin material M flows down the inner surface of the fiber-reinforced resin layer 12 due to its own weight. The resin material M is thus brought into contact with, and covers, the entire inner surface of the reinforcing body 20. In the case where the resin material M is a thermosetting resin, the internal space of the fiber-reinforced resin layer 12 is heated to cure the resin material M. The liner 11 is thus formed. In the case where the resin material M is a thermoplastic resin, the internal space of the fiber-reinforced resin layer 12 is cooled to solidify the resin material M that is in contact with, and covers, the inner surface of the fiber-reinforced resin layer 12. The liner 11 is thus formed. In this example, the liner 11 is formed by reaction injection molding using two or more kinds of liquid materials having low molecular weight and fluidity of low viscosity at normal temperature as the resin material M. In this case, the internal space of the fiber-reinforced resin layer 12 is heated to produce a polymer from a monomer. The internal space of the fiber-reinforced resin layer 12 is then cooled to solidify the polymer. The liner 11 is thus formed.

According to the liner forming step S5, the liner 11 can be easily formed inside the fiber-reinforced resin layer 12 even after the fiber-reinforced resin layer 12 is formed. Moreover, no mold for molding the liner is necessary unlike the case where the liner is formed by injection molding using resin.

The high-pressure tank 10 is completed by attaching the valve 15 to the boss 14.

In the present embodiment, as described above, the cylinder member 21 made of the fiber-reinforced resin and having the fibers oriented in the circumferential direction is formed. Since the fibers in the cylinder member 21 are oriented in the circumferential direction, the strength of the fiber-reinforced resin layer 12 against hoop stress that is generated by the gas pressure is provided by an appropriate amount of fiber-reinforced resin. The dome members 22, 23 can be formed separately from the cylinder member 21 using an appropriate amount of fiber-reinforced resin. Accordingly, the usage of the fiber-reinforced resin for the cylinder member 21 is not increased due to formation of the dome members 22, 23.

The second reinforcing layer 13 made of the fiber-reinforced resin and having the fibers oriented across the two dome members 22, 23 is formed on the outer surface of the reinforcing body 20. The fibers in the second reinforcing layer 13 prevent the dome members 22, 23 from being separated from the cylinder member 21. The dome members 22, 23 are thus prevented from coming off from the end portions of the cylinder member 21 by the gas pressure. The amount of fibers in the second reinforcing layer 13 need only be large enough to prevent the dome members 22, 23 from coming off from the cylinder member 21. Accordingly, the usage of the fiber-reinforced resin is reduced as compared to the helical layers in the cylinder section of the conventional high-pressure tank.

As described above, according to the method for manufacturing the high-pressure tank 10 of the present embodiment, each part of the fiber-reinforced resin layer 12 is formed using an appropriate amount of fiber-reinforced resin. Accordingly, the fiber-reinforced resin is not unnecessarily used, and the usage of the fiber-reinforced resin for the second reinforcing layer 13 on the cylinder member 21 is reduced as compared to the conventional high-pressure tank.

The embodiment disclosed herein should be construed as illustrative in all respects, not restrictive. The scope of the disclosure is not limited to the above description of the embodiment.

Figure 15:
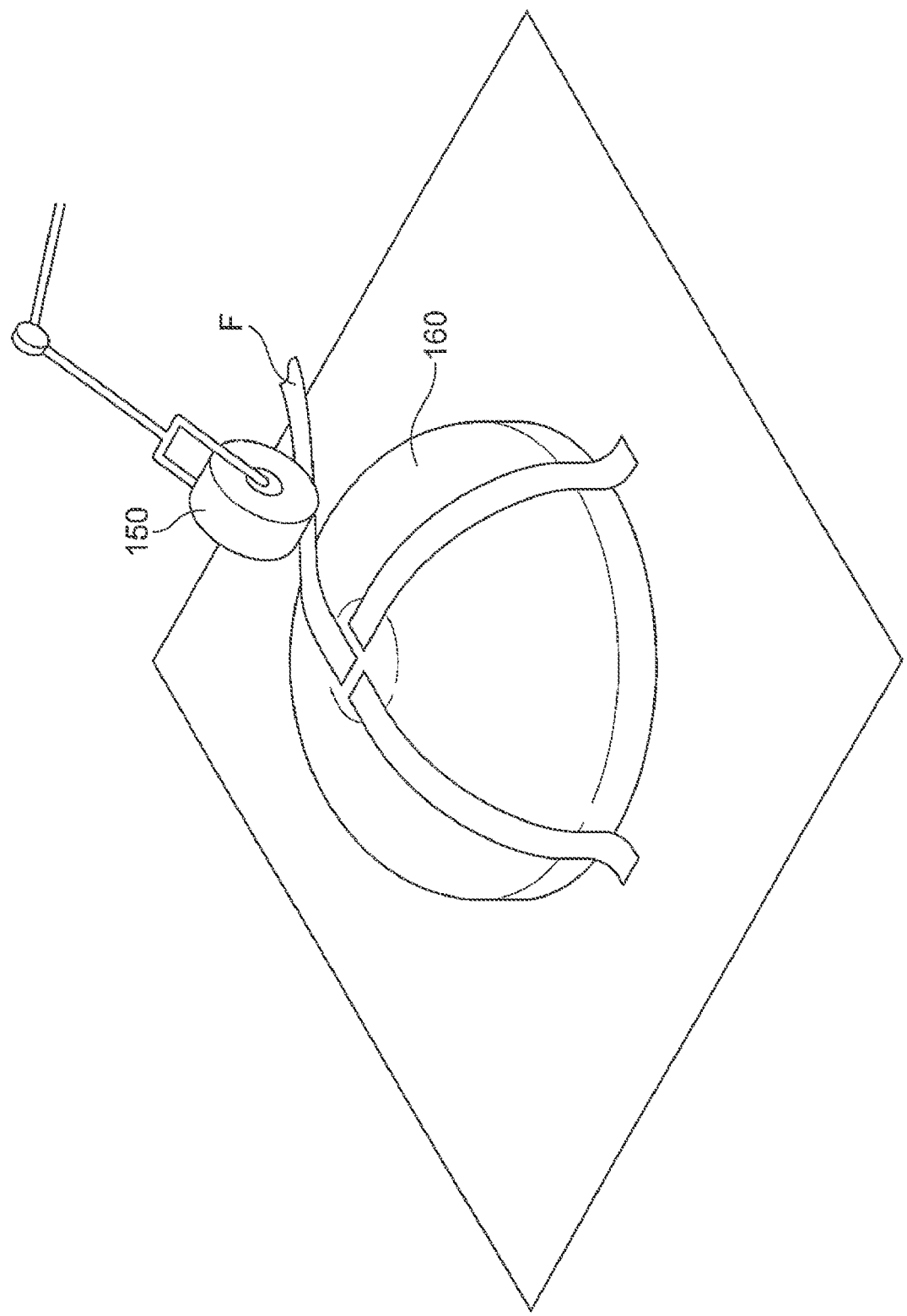
FIG. 15 is a perspective view illustrating a method for manufacturing a high-pressure tank according to a third modification of the disclosure.

For example, in the example described in the above embodiment, the two dome members 22, 23 are formed by filament winding in the dome member forming step S1. However, the disclosure is not limited to this. For example, as in a third modification of the disclosure shown in FIG. 15, the two dome members 22, 23 may be formed by tape placement, namely by pressing and applying the fiber bundle F to the surface of a dome-shaped die (predetermined die) 160 using a roller 150. In this case, a plurality of dies (e.g., two dies) with different shapes can be used according to the shapes of the dome members 22, 23. That is, the two dome members 22, 23 can be formed using at least one die (one or more dies).

Figure 16:
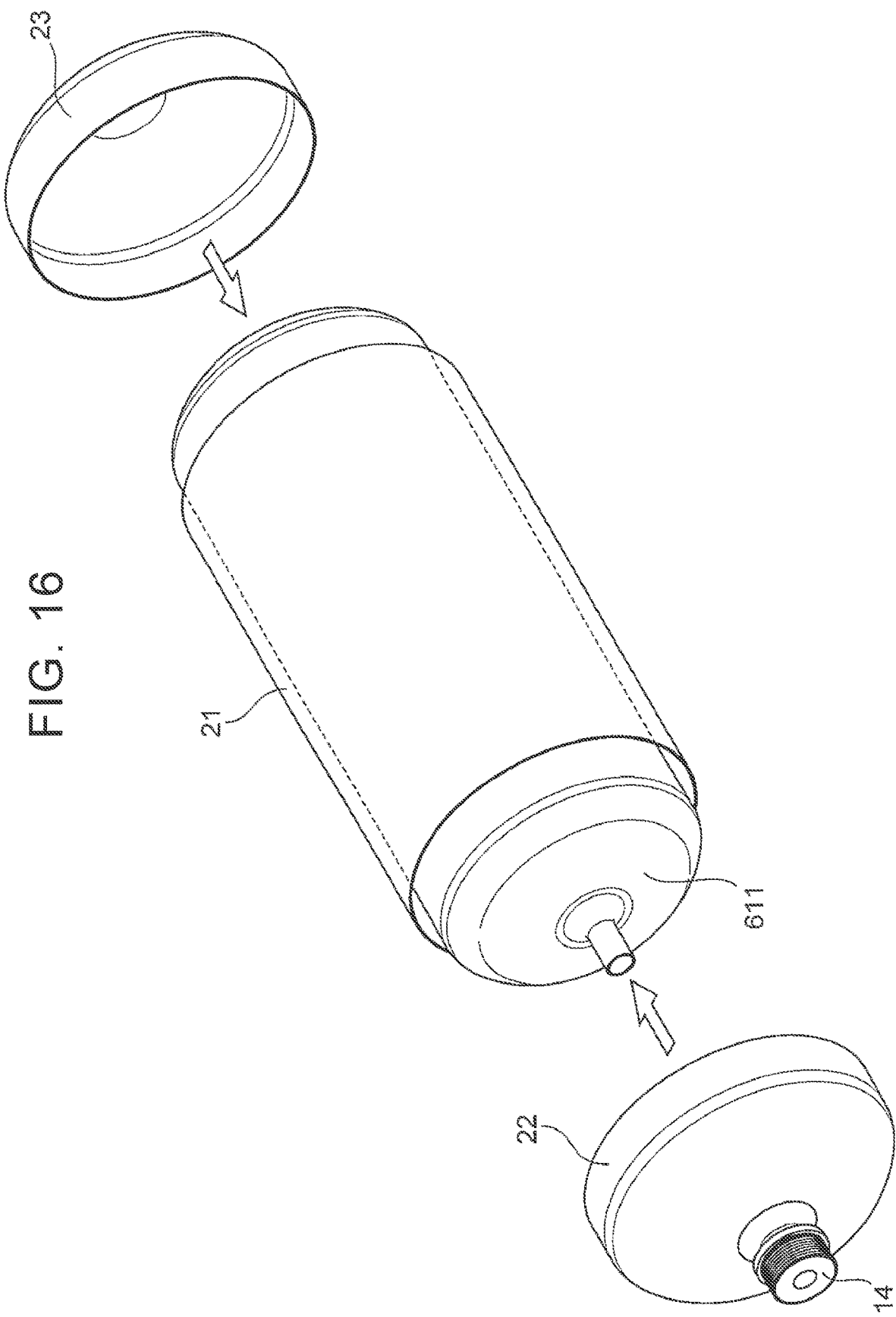
FIG. 16 is a perspective view illustrating a method for manufacturing a high-pressure tank according to a fourth modification of the disclosure.

In the example described in the above embodiment, the liner 11 is formed after the reinforcing body 20 and the second reinforcing layer 13 are formed. However, the disclosure is not limited to this. For example, as in a fourth modification of the disclosure shown in FIG. 16, when combining both end portions 21*a* of the cylinder member 21 and the end portions 22*c*, 23*a* of the two dome members 22, 23 in the joining step S3, the cylinder member 21 and the two dome members 22, 23 may be placed so as to cover a resin liner 611 formed in advance. In this case, the liner forming step S5 is not performed. The liner 611 can be formed by a conventionally known manufacturing method. However, the strength of the liner 611 need not be increased because no fiber bundle is wound around the outer surface of the liner 611 by the FW process. Accordingly, the thickness of the liner 611 can be reduced as compared to the conventional liner. The liner 611 may be made of a metal material such as aluminum alloy instead of the resin material.

In this manufacturing method, the outside diameter of the liner 611 is made slightly smaller than the inside diameter of the cylinder member 21 so that the liner 611 can be easily inserted through the cylinder member 21. Accordingly, with the liner 611 covered by the cylinder member 21 and the two dome members 22, 23, there is clearance between the inner surface of the reinforcing body 20 and the outer surface of the liner 611. However, with the high-pressure tank 10 (the liner 611) filled with hydrogen gas, the liner 611 expands due to the gas pressure, and the inner surface of the reinforcing body 20 is therefore kept in close contact with the outer surface of the liner 611.

Figure 17:
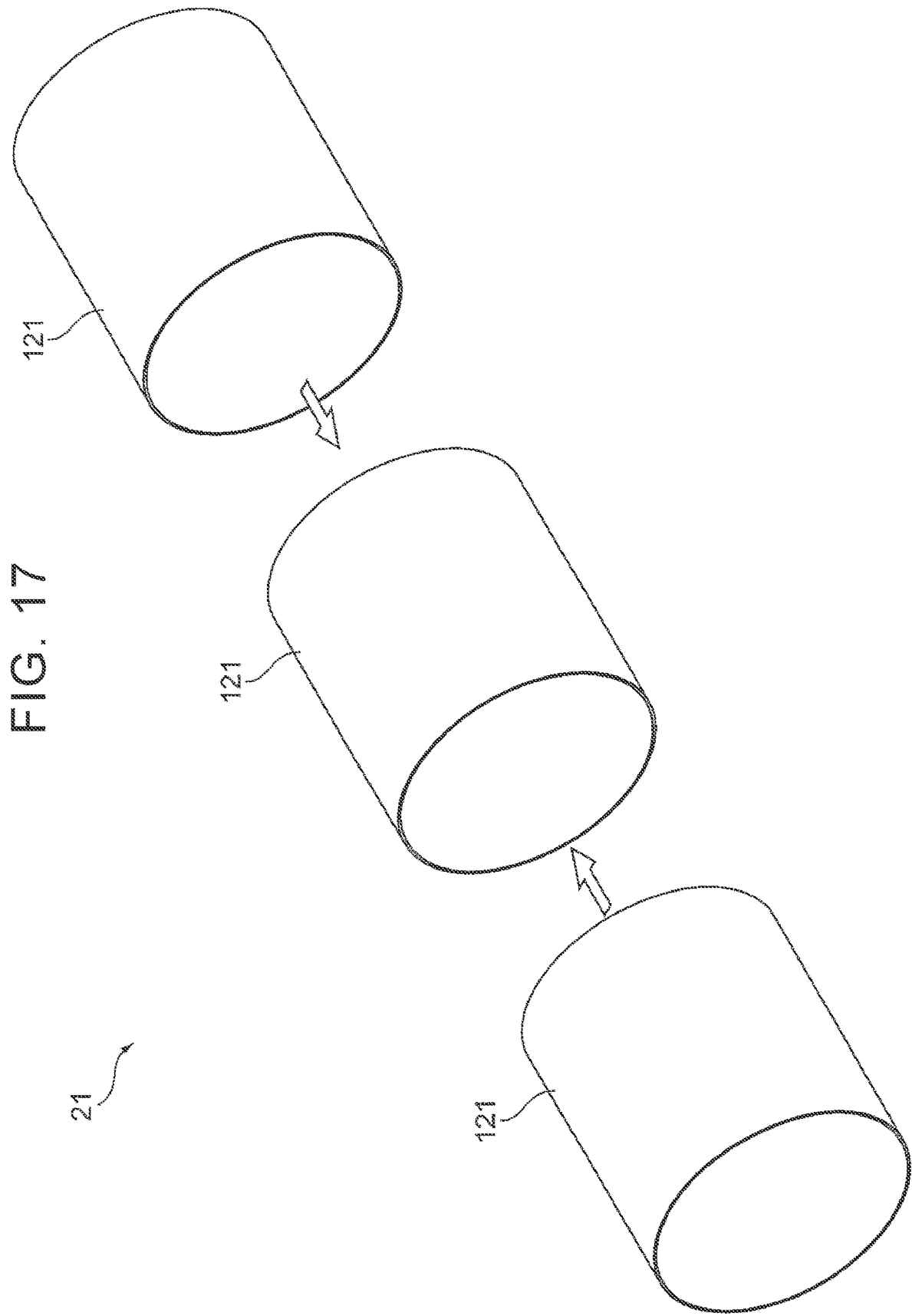
FIG. 17 is a perspective view illustrating a method for manufacturing a high-pressure tank according to a fifth modification of the disclosure.

In the example described in the above embodiment, the cylinder member 21 is composed of a single member. However, the disclosure is not limited to this. For example, as in a fifth modification of the disclosure shown in FIG. 17, the cylinder member 21 may be formed by connecting two or more (three in FIG. 17) cylinder bodies 121. In this case, the two or more cylinder bodies 121 may first be joined to form the cylinder member 21, and the dome members 22, 23 may then be joined to both end portions of the cylinder member 21. Alternatively, the cylinder bodies 121 may first be joined to the dome members 22, 23, one cylinder body 121 for each dome member 22, 23, and the resultant members may then be joined together. The cylinder bodies 121 can be formed by a method similar to that for the cylinder member 21 described above. That is, the cylinder bodies 121 are made of a fiber-reinforced resin and has fibers oriented in the circumferential direction. As in the case where the cylinder member 21 and the dome members 22, 23 are joined together, the cylinder bodies 121 may be connected together with an end portion of one of the cylinder bodies 121 located inside an end portion of the other cylinder body 121. Alternatively, the cylinder bodies 121 may be made to abut on each other and bonded together using an adhesive. For example, in the case where a plurality of types of cylinder bodies 121 with different lengths or sizes is formed, a plurality of dies with different lengths or sizes can be used according to the types of cylinder bodies 121. That is, the cylinder member 21 can be formed using at least one die (one or more dies).

In the example described in the above embodiment, the end portions 21*a* of the cylinder member 21 and the end portions 22*c*, 23*a* of the dome members 22, 23 are fitted together in the joining step S3. However, the disclosure is not limited to this. The end portions 21*a* of the cylinder member 21 and the end portions 22*c*, 23*a* of the dome members 22, 23 may be made to abut on each other and bonded together using an adhesive.

Figure 18:
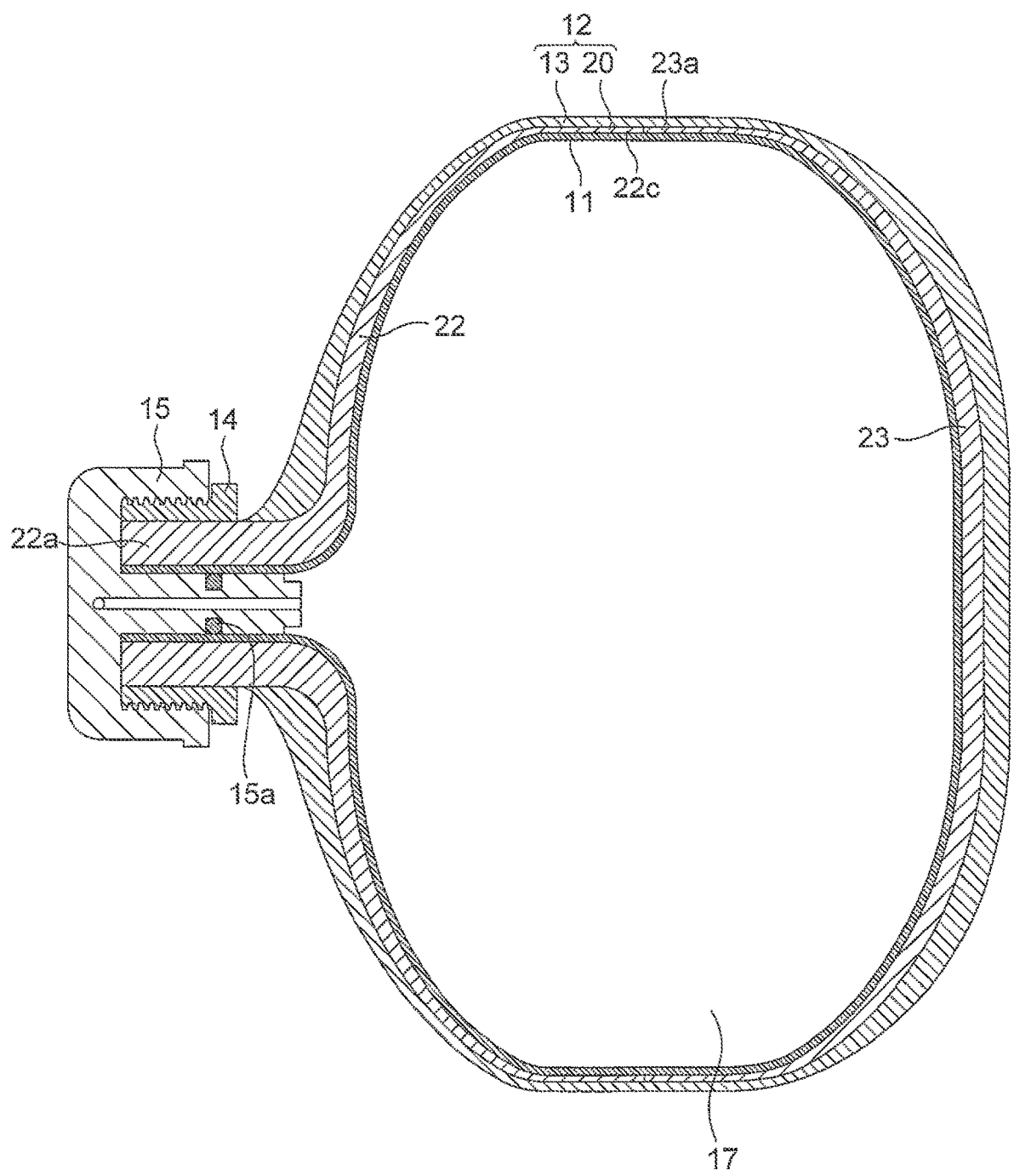
FIG. 18 is a sectional view illustrating a method for manufacturing a high-pressure tank according to a sixth modification of the disclosure.

As in a sixth modification of the disclosure shown in FIG. 18, the reinforcing body 20 may be composed of two members (e.g., the two dome members 22, 23). In this case, the high-pressure tank 10 can be manufactured by performing all the steps of the above embodiment except the cylinder member forming step S2, namely the dome member forming step S1, the joining step S3, the second reinforcing layer forming step S4, and the liner forming step S5, in a manner similar to that of the above embodiment. In the case where the two dome members 22, 23 are joined together, it is preferable to make the end portion 22*c* of the dome member 22 and the end portion 23*a* of the dome member 23 to abut on each other and bond them together using an adhesive, because the end portion 22*c* of the dome member 22 and the end portion 23*a* of the dome member 23 have the same size.

Figure 19:
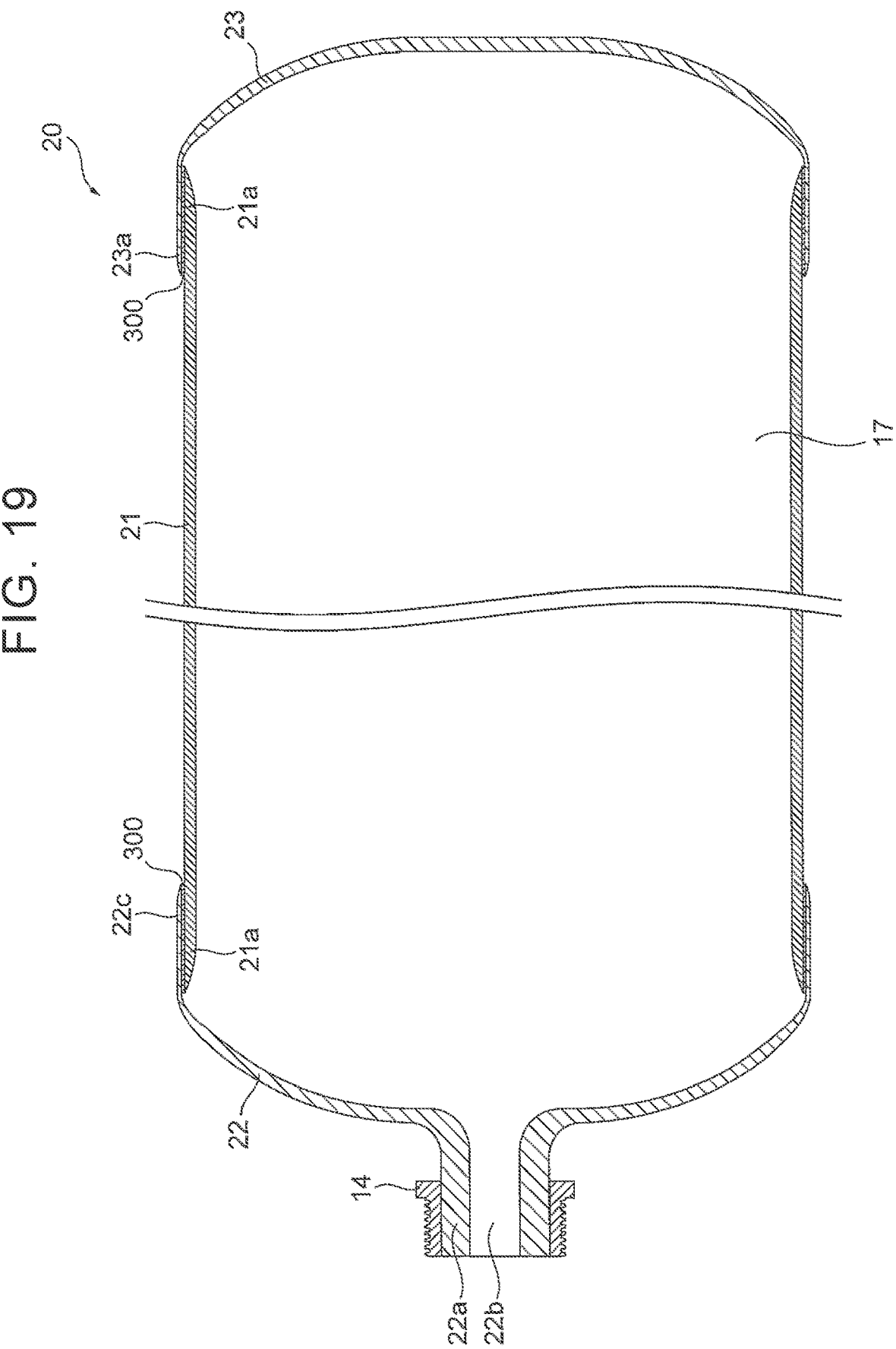
FIG. 19 is a sectional view illustrating a method for manufacturing a high-pressure tank according to a seventh modification of the disclosure.

In the example described in the above embodiment, after thermally curing the dome members 22, 23, the end portions 22*c*, 23*a* of the dome members 22, 23 are inserted into the end portions 21*a* of the cylinder member 21, and the dome members 22, 23 and the cylinder member 21 are joined together. However, the disclosure is not limited to this. As in a seventh modification of the disclosure shown in FIG. 19, after thermally curing the cylinder member 21, the end portions 21*a* of the cylinder member 21 may be inserted into the end portions 22*c*, 23*a* of the dome members 22, 23, and the cylinder member 21 and the dome members 22, 23 may be joined together. In this case, the cylinder member 21 and the dome members 22, 23 can be easily fitted together. Moreover, the outer shape of the dome members 22, 23 can be adjusted, and the dome members 22, 23 can be in close contact with the cylinder member 21.

In the example described in the above embodiment, the liner 11 is formed in the liner forming step S5 by rotating the fiber-reinforced resin layer 12 so that the resin material having fluidity covers the entire inner surface of the fiber-reinforced resin layer 12. However, the disclosure is not limited to this. For example, the liner 11 may be formed by blow molding or thermal spraying. In blow molding, the liner 11 is formed by extruding a thermoplastic resin material, softened by heating, in a tubular shape into the fiber-reinforced resin layer 12 through the through hole 22*b*, introducing compressed air into the tubular resin material so that the resin material contacts and covers the inner surface of the fiber-reinforced resin layer 12, and solidifying the resin material. In thermal spraying, the liner 11 is formed by spraying a liquid or softened resin material onto the inner surface of the fiber-reinforced resin layer 12.

In the example described in the above embodiment, the liner 11 is formed after the second reinforcing layer 13 is formed on the outer surface of the reinforcing body 20. However, the disclosure is not limited to this. The second reinforcing layer 13 may be formed on the outer surface of the reinforcing body 20 after the liner 11 is formed inside the reinforcing body 20. In this case, it is preferable that the liner 11 be made of a thermosetting resin such as epoxy resin so that the liner 11 is not softened when curing the second reinforcing layer 13.

In the example described in the above embodiment, the dome member 22 with the through hole 22b is formed in the dome member forming step S1. However, the disclosure is not limited to this. For example, the through hole 22b may be formed in the fiber-reinforced resin layer 12 after the joining step S3.

In the example described in the above embodiment, the cylinder member 21 is formed using a die. However, the disclosure is not limited to this. For example, the cylinder member 21 may be formed by winding a fiber sheet or a fiber bundle around a liner formed by a conventionally known manufacturing method, and two dome members 22, 23 may be joined to the cylinder member 21.

In the example described in the above embodiment, the through hole 22b is provided only in the dome member 22, and the boss 14 is attached to only one end of the high-pressure tank 10. However, the disclosure is not limited to this. A through hole may be formed in both of the dome members 22, 23, and a boss may be attached to both one end and the other end of the high-pressure tank 10.

What is claimed is:

1. A method for manufacturing a high-pressure tank including a liner configured to store gas and a fiber-reinforced resin layer made of a fiber-reinforced resin and covering an outer surface of the liner, the fiber-reinforced resin layer having a first reinforcing layer covering the outer surface of the liner and a second reinforcing layer covering an outer surface of the first reinforcing layer, the method comprising:
    forming a cylinder member made of the fiber-reinforced resin and having fibers oriented in a circumferential direction of the cylinder member;
    forming two dome members made of the fiber-reinforced resin;
    forming a reinforcing body that is the first reinforcing layer by joining both end portions of the cylinder member and end portions of the two dome members; and
    forming on an outer surface of the reinforcing body the second reinforcing layer made of the fiber-reinforced resin and having fibers oriented across the two dome members, wherein
    either or both of the two dome members are formed so as to have a through hole, and
    the liner is formed such that the liner covers an inner surface of the reinforcing body by introducing a resin material into the reinforcing body through the through hole.

2. The method according to claim 1, wherein
    the cylinder member is formed by connecting a plurality of cylinder bodies each made of the fiber-reinforced resin and having fibers oriented in a circumferential direction of the cylinder body.

3. The method according to claim 1, wherein
    the liner is formed by introducing the resin material having fluidity into the reinforcing body, rotating the reinforcing body to cause the resin material to cover the inner surface of the reinforcing body, and solidifying the resin material covering the inner surface of the reinforcing body.

4. The method according to claim 1, wherein
    after thermally curing the cylinder member, the cylinder member is inserted into either or both of the two dome members, and the cylinder member and the either or both of the two dome members are joined together.

5. The method according to claim 1, wherein
    after thermally curing either or both of the two dome members, the either or both of the two dome members are inserted into the cylinder member, and the either or both of the two dome members and the cylinder member are joined together.

6. The method according to claim 1, wherein
    the two dome members are formed by winding a resin-impregnated fiber bundle around a predetermined die in such a manner that the fiber bundle covers an outer surface of the predetermined die and then dividing a resultant winding body of the fiber bundle wound around the predetermined die into parts.

7. A method for manufacturing a high-pressure tank including a liner configured to store gas and a fiber-reinforced resin layer made of a fiber-reinforced resin and covering an outer surface of the liner, the fiber-reinforced resin layer having a first reinforcing layer covering the outer surface of the liner and a second reinforcing layer covering an outer surface of the first reinforcing layer, the method comprising:
    forming a cylinder member made of the fiber-reinforced resin and having fibers oriented in a circumferential direction of the cylinder member;
    forming two dome members made of the fiber-reinforced resin;
    forming a reinforcing body that is the first reinforcing layer by joining both end portions of the cylinder member and end portions of the two dome members; and
    forming on an outer surface of the reinforcing body the second reinforcing layer made of the fiber-reinforced resin and having fibers oriented across the two dome members, wherein
    the second reinforcing layer is formed by
    placing a plurality of resin-impregnated fiber bundles in such a manner that the fiber bundles extend in an axial direction of the reinforcing body at predetermined intervals in a circumferential direction of the reinforcing body and at a predetermined distance from the outer surface of the reinforcing body, and
    rotating portions on a first end side of the fiber bundles relative to portions on a second end side of the fiber bundles in the circumferential direction of the reinforcing body.

8. The method according to claim 7, wherein
    at least one first tilted layer and at least one second tilted layer are formed when forming the second reinforcing layer, the at least one first tilted layer being formed by rotating the portions on the first end side of the fiber bundles in a first direction, and the at least one second tilted layer being formed by rotating the portions on the first end side of the fiber bundles in a second direction that is opposite to the first direction.

9. The method according to claim 8, wherein
    the number of the at least one first tilted layer and the number of the at least one second tilted layer are the same.

* * * * *